United States Patent [19]
Maeda et al.

[11] Patent Number: 5,796,630
[45] Date of Patent: Aug. 18, 1998

[54] PROTECTIVE RELAY SYSTEM PROVIDED WITH DIFFERENCE AND ADDITION FILTERS

[75] Inventors: Takafumi Maeda; Hiroshi Yamakawa; Fumio Andow; Mitsuru Yamaura; Yasuhiro Kurosawa, all of Tokyo-to, Japan

[73] Assignee: Kabushiki Kaisha Toshiba, Kawasaki, Japan

[21] Appl. No.: 600,935

[22] PCT Filed: Jun. 29, 1995

[86] PCT No.: PCT/JP95/01297

§ 371 Date: Jul. 19, 1996

§ 102(e) Date: Jul. 19, 1996

[87] PCT Pub. No.: WO96/01515

PCT Pub. Date: Jan. 18, 1996

[30] Foreign Application Priority Data

Jul. 1, 1994 [JP] Japan .................. 6-173266

[51] Int. Cl.$^6$ .................................................. H02J 13/00
[52] U.S. Cl. .................. 364/492; 364/572; 364/480; 364/481; 364/483; 361/160; 361/187
[58] Field of Search ..................... 364/492, 493, 364/724.01, 178, 480–483, 550, 551.01, 570, 572, 574, 575, 484; 324/500, 522, 531, 605, 623, 712, 713, 76.15, 76.24, 76.28, 76.29, 76.31, 76.38, 76.42, 76.44, 76.58, 76.68; 361/90–92, 160, 185, 187; 307/132 E, 132 M, 125, 127, 130, 131, 105

[56] References Cited

U.S. PATENT DOCUMENTS 5,455,776  10/1995  Novosel ..................... 364/481
5,506,789  4/1996   Russell et al. ............... 364/492
5,523,675  6/1996   Kurosawa .................. 364/484
5,572,138  11/1996  Nimmersjö ................. 364/483

FOREIGN PATENT DOCUMENTS 4-161018  6/1992   Japan .
5-300639  11/1993  Japan .
7-95722   4/1995   Japan .

Primary Examiner—James P. Trammell
Assistant Examiner—Hal D. Wachsman
Attorney, Agent, or Firm—Foley & Lardner

[57] ABSTRACT

A protective relay system detects a first electric variable and a second electric variable of a power system to discriminate in a time series whether or not a fault portion of a line or equipment included in the power system exists within a predetermined range, so as to determine whether protection of the power system should be carried out. The system includes a digital filter for outputting a first difference electric variable data indicative of a difference between at least two sample data of plural sampling data of the first electric variable and a difference between at least two sample data of plural sample data of the second electric variable at plural sampling times of the time series. The system also includes an addition filter for outputting first and second additive electric variable data indicative of orthogonal vector data with respect to the first and second difference electric variable data. The system further includes a relay control unit for calculating controlled variables of a relay operation in the power system on the basis of the first and second difference electric variable data at a certain sampling time, so as to judge whether or not protection of the power system should be carried out.

13 Claims, 16 Drawing Sheets

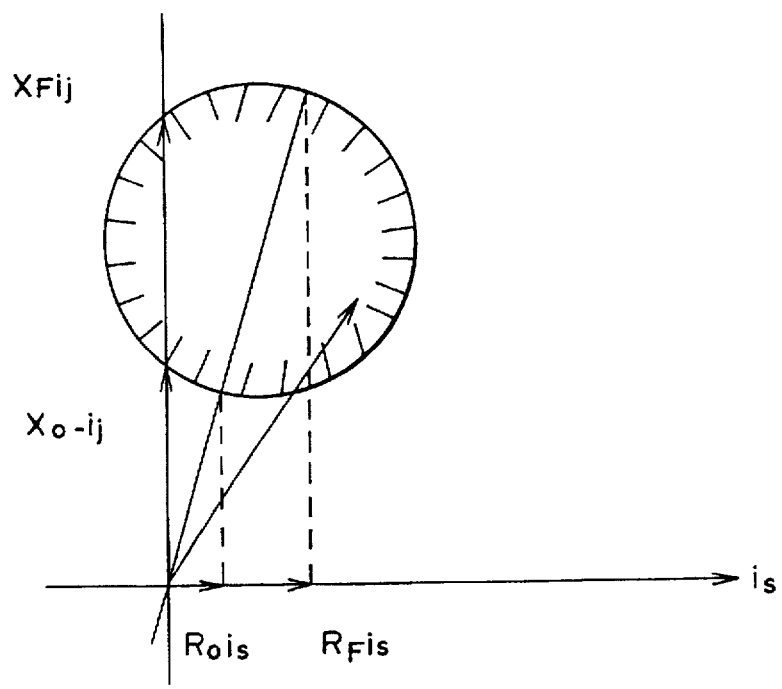
F I G. 11

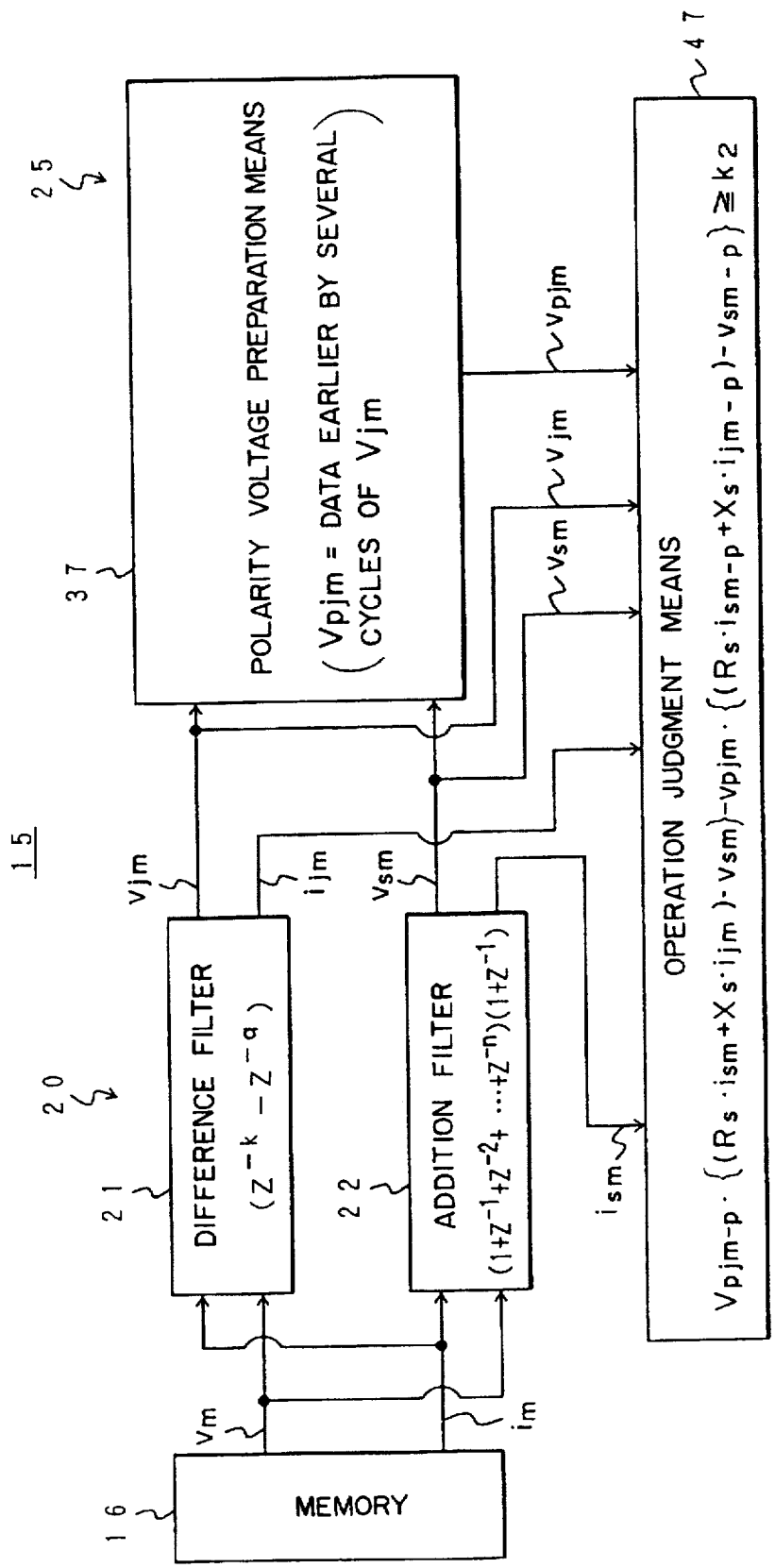
F I G. 15

PROTECTIVE RELAY SYSTEM PROVIDED WITH DIFFERENCE AND ADDITION FILTERS

TECHNICAL FIELD

This invention relates to a protective relay system provided with a difference filter and an addition filter, and more particularly to a protective relay system substantially free from influence of harmonic components which may be included in a fault current.

Background Art

The main technical object of protective relay systems used for protecting the power system is to lessen influence of harmonic components of fault current and fault voltage produced at the time of system failure. Particularly, in recent years, since charge capacity component of the system in equipments or facilities such as cable (power) transmission line and/or phase modifying capacitor, etc. has been increased, the order of harmonic wave produced in the system power has tendency to increase (value twice or three times greater than the fundamental wave).

For this reason, in a method of attenuating harmonic components by filter which has been conventionally applied, it is necessary to prolong delay time of the filter in order to ensure desired attenuation quantity, resulting in delayed operation time of the relay. In order to solve such a problem, there has been conventionally employed an approximation system such that even if any harmonic component is included in the system power, there essentially results no influence of the harmonic wave.

One example of the system employed at present will be described below.

In a transmission line 2 of FIG. 1, assuming now that voltage and current at point A of installation of a protective relay 1 are respectively v and i when transmission line impedance constants up to the fault point F are such that resistance is R and inductance is L, the differential equation of the transmission line 2 is expressed by the following equation (1) in the case where fault point (F) voltage is zero. By carrying out approximate calculation of the differential term (di/dt) of this equation (1), it is possible to calculate, with high accuracy, value proportional to inductance L without eliminating harmonic wave by using filter.

$$v = R \cdot i + L \frac{di}{dt} \quad (1)$$

An example of an actual method for digital operation practically applied is indicated below.

$$v_m + v_{m-1} = R \cdot (i_m + i_{m-1}) + L \cdot (i_m - i_{m-1}) \quad v_{m-1} + v_{m-2} = R \cdot (i_{m-1} + v_{m-2}) + L \cdot (i_{m-1} - v_{m-2}) \quad (2)$$

When $X(=\omega_0 \cdot L)$ is calculated from the equation (2), the following equation (3) is obtained. The frequency characteristic of the reactance value $X_m/X$ (true value) is represented by the following equation (4), and its characteristic is as indicated by line (a) of FIG. 2. FIG. 2 is a graph in which frequency is taken on the abscissa and reactance measured value is taken on the ordinate. In this case, the line (a) indicates the characteristic in the case where sampling frequency is 600 Hz, and the line (b) indicates the characteristic in the case where sampling frequency is 4800 Hz.

$$Lm = X_m/\omega_0 = \frac{(v_m + v_{m-1}) \cdot (i_{m-1} + i_{m-2}) - (v_{m-1} + v_{m-2}) \cdot (i_m + I_{m-1})}{(i_m - i_{m-1}) \cdot (i_{m-1} + i_{m-2}) - (i_{m-1} - i_{m-2}) \cdot (i_m + i_{m-1})} \quad (3)$$

$$L_m/L \text{ (true value)} = \tan(\omega_0 T/2)/\tan(\omega T/2) \quad (4)$$

In this case, since $i_m = I \cdot \sin(\omega t_m)$ and $v_m = V \cdot \sin(\omega t_m + \theta)$, differential approximation quantity "$i_m - i_{m-1}$" and differentiated quantity "$v_v + v_{m-1}$" can be respectively expressed by the following equations (5) and (6).

$$i_m - i_{m-1} = 2I \cdot \sin(\omega T/2) \cdot \cos(\omega t_m - \omega T/2) \quad (5)$$

$$v_m + v_{m-1} = 2V \cdot \cos(\omega T/2) \cdot \sin(\omega t_m - \omega T/2 + \theta) \quad (6)$$

In the above equation, T is sampling period, $\omega$ is angular frequency, and $\theta$ is voltage lead phase with respect to current.

As shown in FIG. 2, it is understood that according as frequency deviates from that of the fundamental wave, value of $L_m/L$ (true value) becomes smaller than 1. This value is permitted to keep value in the vicinity of 1 at values approximately twice or third times greater than the fundamental wave if the value of ($\omega T/2$) is further held down to lower value (the sampling period is reduced). The frequency characteristic when the sampling frequency is set to value eight times greater than the fundamental wave is shown FIG. 2(b). Namely, from a qualitative point of view, the relationship between the differential approximation quantity "$i_m - i_{m-1}$" and the differentiated quantity "$v_m + v_{m-1}$" are as indicated by the following equations (7) and (8). From these equations, it is indicated that its approximation accuracy is improved.

$$\sin(\omega T/2) = \omega T/2, \cos(\omega T/2) = 1 \quad i_m - i_{m-1} = 2I \cdot \sin(\omega T/2) \cdot \cos(\omega t_m - \omega T/2) = 2I \cdot (\omega T/2) \cdot \cos(\omega t_m - \omega T/2) \quad (7)$$

$$v_m + v_{m-1} = 2V \cdot \cos(\omega T/2) \cdot \sin(-t_m - \omega T/2 + \theta) = 2V \cdot \sin(\omega t_m - \omega T/2 + \theta) \quad (8)$$

Accordingly, if the sampling frequency is caused to become high (the period is reduced), the approximation accuracy of differentiation can be improved. However, the value of the equation (7) becomes very small value with respect to the amplitude value I, and noise error $\epsilon$ included in the sample or sampled data "$i_m, i_{m-1}$" effectively becomes great. From a viewpoint of practical use, it is very difficult to ensure accuracy.

$$(i_m - i_{m-1})/(\omega_0 T/2) = 2I \cdot (\omega/\omega_0) \cdot \cos(\omega t_m - \omega T/2)) + \epsilon/(\omega_0 T/2) \quad (9)$$

In the above equation, $\epsilon$ is noise error. This noise error is white noise, etc. produced in the analog circuit, and quantization error, etc. produced at the time of analog-to-digital conversion.

When the sampling period T=i/4800 sec., and $\omega_0 = 2\pi \cdot 50$ Hz, error of the portion "$\epsilon/(\omega_0 T/2)$" of the equation (9) is as indicated by the following equation (10). The error is amplified so that it becomes equal to value 30 times greater than the original value.

$$\epsilon/(\omega_0 T/2) = 96\epsilon/\pi = 30.557\epsilon \quad (10)$$

SUMMARY OF THE INVENTION

This invention has been made in view of the above-mentioned circumstances, and its object is to provide a protective relay system in which error amplification by differential approximation is suppressed so that there results the characteristic that $L_m/L$ (true value) is unlimitedly equal to 1 in broad frequency band, and free from influence of harmonic components produced in fault voltage/fault current of the power system.

To achieve the above-mentioned object, a protective relay system according to this invention is directed to a protective relay system adapted for detecting, in time series manner, first electric variable (quantity of electricity) and second electric variable of the power system to discriminate on the basis of changes in the respective electric variables in the time series whether or not fault portion (point) of line or equipment included in the power system exists (falls) within a predetermined range thus to protect the power system, the system comprising: digital filter means including a difference filter for outputting first difference electric variable data indicative of difference between at least two sample data of plural sample data of the first electric variable and second difference electric variable data indicative of difference between at least two sample data of plural sample data of the second electric variable at plural sampling times of the time series, and an addition filter for outputting first and second additive electric variable data indicative of data respectively orthogonal to the first and second difference electric variable data in terms of vector; and relay control means for calculating controlled variable of the relay operation in the power system on the basis of the first and second difference electric variable data at a certain sampling time, first and second additive electric variable data at the certain sampling time point, the first and second difference electric variable data at any other sampling time point and the first and second additive electric variable data at the other sampling time point to judge (discriminate), on the basis of the controlled variables, the operation as to whether or not protection of the power system should be carried out.

In the above-mentioned protective relay system, the difference filter is a filter in which transfer function "$Z^{-k}=Z^{-q}$" (Z is Z transform operator and k<q) is used to output voltage data $v_{jm}$ and current data $i_{jm}$ serving as the first and second difference electric variable data at certain sampling time $t_m$ and voltage data $v_{jm-p}$ and current data $i_{jm-p}$ at any other sampling time $t_{m-p}$, and the addition filter is a filter in which transfer function "$(1+Z^{-1}+Z^{-2}+\ldots+Z^{-n})(1+Z^{-1})$" ("n+1=k+q") is used to output voltage data $v_{sm}$ and current data $i_{sm}$ serving as the first and second additive electric variable data at the certain sampling time $t_m$ and voltage data $v_{sm-p}$ and current data $i_{sm-p}$ at the other sampling time $t_{m-p}$.

Further, in the above-mentioned protective relay system, the relay control means includes controlled variable calculation means for calculating relay controlled variable including at least one of reactance value, ohm value and operation/ suppression quantity on the basis of the voltage data $v_{jm}$ and $v_{jm-p}$ and the current data $i_{jm}$ and $i_{jm-p}$ which are outputs of the difference filter of the digital filter means and the voltage data $v_{sm}$ and $v_{sm-p}$ and the current data $i_{sm}$ and $i_{sm-p}$ which are outputs of the addition filter; and operation judgment means for judging whether or not value of the relay controlled variable calculated by the controlled variable calculation means has a predetermined relationship with respect to a predetermined setting value and constant. These components are the fundamental configuration of the protective relay system according to this invention.

In accordance with the protective relay system according to the first aspect of this invention, in the above-mentioned fundamental configuration, the controlled variable calculation means is constituted by reactance value calculation means for determining reactance value $X_m$ by the following equation (A) on the basis of the current data $i_{jm}$ and $i_{jm-p}$ which are outputs of the difference filter, and the voltage data $v_{sm}$ and $v_{sm-p}$ and the current data $i_{sm}$ and $i_{sm-p}$ which are outputs of the addition filter $$X_m = \frac{-v_{sm} \cdot i_{sm-p} + i_{sm} \cdot v_{sm-p}}{-i_{jm} \cdot i_{sm-p} + i_{jm-p} \cdot i_{sm}} \tag{A}$$

Moreover, the operation judgment means judges the discriminant "$X_m \leq X_s$" from reactance value $X_m$ and setting value $X_s$ determined by the reactance calculation means.

In accordance with the protective relay system according to the second aspect of this invention, in the above-mentioned configuration, the controlled variable calculation means is constituted by operation/suppression quantity calculation means for calculating operation/suppression quantities $a_m$ and $b_m$ corresponding to reactance value by the following equation (B) on the basis of the current data $i_{jm}$ and $i_{jm-p}$ which are outputs of the difference filter and the voltage data $v_{sm}$ and $v_{sm-p}$ and the current data $i_{sm}$ and $i_{sm-p}$ which are outputs of the addition filter:

$$a_m = -v_{sm} \cdot i_{sm-p} + i_{sm} \cdot v_{sm-p} \quad b_m = -i_{jm} \cdot i_{sm-p} + i_{jm-p} \cdot i_{sm} \tag{B}$$

Moreover, the operation judgment means judges discriminant "$b_m \cdot X_s - a_m \geq K0$" from the operation/suppression quantities am and bm determined by the operation/suppression quantity calculation means, and setting value $X_s$ and constant K0.

In accordance with the protective relay system according to the third aspect of this invention, in the above-mentioned fundamental configuration, the controlled variable calculation means is constituted by ohm value calculation means for determining ohm value Rm by the following equation (C) on the basis of the current data $i_{jm}$ and $i_{jm-p}$ which are outputs of the difference filter and the voltage data $v_{sm}$ and $v_{sm-p}$ and the current data $i_{sm}$ and $i_{sm-p}$ which are outputs of the additive filter:

$$R_m = \frac{-i_{jm} \cdot v_{sm-p} + v_{sm} \cdot i_{jm-p}}{-i_{jm} \cdot i_{sm-p} + i_{jm-p} \cdot i_{sm}} \tag{C}$$

Moreover, the operation judgment means judges discriminant "$R_m \leq R_s$" from the ohm value $R_m$ determined by the ohm value calculation means and setting value $R_s$.

In accordance with the protective relay system according to the fourth aspect of this invention, in the fundamental configuration, the controlled variable calculation means is constituted by operation/suppression quantity calculation means corresponding to ohm value by the following equation (D) on the basis of the current data $i_{jm}$ and $i_{jm-p}$ which are outputs of the difference filter and the voltage data $v_{sm}$ and $v_{sm-p}$ and the current data $i_{sm}$ and $i_{sm-p}$ which are outputs of the addition filter:

$$c_m = -i_{jm} \cdot v_{sm-p} + v_{sm} \cdot i_{jm-p} \quad b_m = -i_{jm} \cdot i_{sm-p} + i_{jm-p} \cdot i_{sm} \tag{D}$$

Moreover, the operation judgment means judges discriminant "$b_m \cdot R_s - c_m \leq K1$" from the operation/suppression quantity $C_m$ and $b_m$ determined by the operation/suppression quantity calculation means, and setting value $R_s$ and constant K1.

In accordance with the protective relay system according to the fifth aspect of this invention, in the above-mentioned configuration, the controlled variable calculation means is constituted by reactance value calculation means for determining reactance value $X_m$ by the following equation (A) on the basis of the current data $i_{jm}$ and $i_{jm-p}$ which are outputs of the difference filter, and the voltage data $v_{sm}$ and $v_{sm-p}$ and the current data $i_{sm}$ and $i_{sm-p}$ which are outputs of the addition filter $$X_m = \frac{-v_{sm} \cdot i_{sm-p} + i_{sm} \cdot v_{sm-p}}{-i_{jm} \cdot i_{sm-p} + i_{jm-p} \cdot i_{sm}} \quad (A)$$

and ohm value calculation means for determining ohm value $K_m$ by the following equation (C) on the basis of the current data $i_{jm}$ and $i_{jm-p}$ which are outputs of the difference filter and the voltage data $v_{sm}$ and $v_{sm-p}$ and the current data $i_{sm}$ and $i_{sm-p}$ which are outputs of the addition filter:

$$R_m = \frac{-i_{jm} \cdot v_{sm-p} + v_{sm} \cdot i_{jm-p}}{-i_{jm} \cdot i_{sm-p} + i_{jm-p} \cdot i_{sm}} \quad (C)$$

Moreover, the operation judgment means serves to judge (discriminate) the discriminant (E) on the basis of the reactance value $R_m$ determined by the reactance value calculation means the ohm value $R_m$ determined by the ohm value calculation means:

$$(R_m - R_0) \cdot (R_m - R_F) \cdot (X_m - X_0) \cdot (X_m - X_f) \leq 0 \quad (E)$$

where $R_0$ (ohmic component) is the offset mho near side setting value $X_0$ (reactance component) is offset mho near side setting value $R_F$ (ohmic component) is the offset mho far side setting value, and $X_F$ (reactance component) is the offset mho far side setting value In accordance with the protective relay system according to the sixth aspect of this invention, in the above-mentioned fundamental configuration, the controlled variable calculation means is constituted by polarity voltage preparation means for preparing polarity voltage $v_{pjm}$ having a predetermined relationship with respect to the voltage data $v_{jm}$ and/or $v_{sm}$ on the basis of the voltage data $v_{jm}$ which is output of the differential filter and voltage data $v_{sm}$ which is output of the addition filter, and the operation judgment means serves to judge, whether or not the following discriminant holds, on the basis of voltage data $v_{jm}$ and current data $i_{jm}$ which are outputs of the difference filter, voltage data $v_{sm}$ and current data $i_{sm}$ which are outputs of the additive filter, polarity voltage $v_{pjm}$ which is output of the polarity voltage preparation means, and setting values $R_s$ and $X_s$:

$$v_{pjm-p} \cdot \{(R_s \cdot i_{sm} + X_s \cdot i_{jm}) - v_{sm}\} - v_{pjm} \cdot \{(R_s \cdot i_{sm-p} + X_s \cdot i_{jm-p}) - v_{sm-p}\} \geq K2 \quad (F)$$

In accordance with the protective relay system according the seventh aspect of this invention, in the above-mentioned sixth aspect, the polarity voltage preparation means synthesizes a voltage orthogonal in a fundamental wave with respect to output $v_{sm}$ of the addition filter in terms of vector to output it as the polarity voltage $v_{pjm}$ to the operation judgment means.

In accordance with the protective relay system according to the eighth aspect of this invention, in the above-mentioned sixth aspect, the polarity voltage preparation means serves to output a voltage earlier by predetermined time of voltage data $v_{jm}$ from the difference filter at the sampling time point $t_m$ to the operation judgement means as the polarity voltage $v_{pjm}$.

In accordance with the protective relay system according to the ninth aspect of this invention, in the above-mentioned sixth aspect, the polarity voltage preparation means serves to synthesize positive phase voltage from output $v_{jm}$ of the difference filter and output $v_{sm}$ of the addition filter with three-phase voltage of the power system at the sampling time tm being as reference to output it as the polarity voltage $j_{pjm}$ to the operation determination means.

In accordance with the protective relay system according to the tenth aspect of this invention, in the above-mentioned fundamental configuration, the controlled variable calculation means is composed of charge current compensation means for determining a predetermined electric variable $(i_{sm} - C_s \cdot v_{jm})$ on the basis of the voltage data $v_{jm}$ as output of the difference filter, and the current data $i_{sm}$ as output of the addition filter at the sampling time point $t_m$, and setting value $C_s$; and transmitting/receiving means adapted for transmitting the predetermined electric variable $(i_{sm} - C_s \cdot v_{jm})$ delivered from the charge current compensation means to a destination electric station (B electric station) where the protective relay system is installed and for receiving electric variable $(i_{sm} - C_s \cdot v_{jm})$ B from any other protective relay system installed in the destination electric station (B electric station), and the operation judgment means serves to judges, on the basis of the predetermined electric variable $(i_{sm} - C_s \cdot v_{jm})$ delivered from the charge current compensation means and the predetermined electric variable $(i_{sm} - C_s \cdot v_{jm})$ B delivered from the transmitting/receiving means, whether or not the following discriminant (G) holds:

$$\|(i_{sm} - C_s \cdot v_{jm}) + (i_{sm} - C_s \cdot v_{jm})B\| \geq ka \cdot \{\|i_{sm} - C_s \cdot v_{jm}\| + \|(i_{sm} - C_s \cdot v_{jm})B\|\} + kb \quad (G)$$

where $\|am\|$ is quantity proportional to amplitude value of a.c. electric variable a at the time point of $t_m$.

ka is No. ratio suppression digits (absolute number), and kb is minimum sensitively current.

The fundamental operation of the protective relay system constructed as above will be described below.

When sample data of current $i = I \cdot \sin(\omega t)$ is inputted to the digital filter means, processing as described below is carried out.

Initially, by allowing such sample data to be passed through the digital filter of the first stage $(1 + Z^{-1} + Z^{-2} + \ldots + Z^{-n})$, current $i'_{sm}$ at time point tm is obtained.

$$\begin{aligned}i'_{sm} &= I \cdot (\sin(\omega t_m) + \sin(\omega t_m - \omega T) + \\ &\quad \sin(\omega t_m - 2\omega T) \ldots + \sin(\omega t_m - n\omega T)) \\ &= I \cdot (\sin((n+1)\omega T/2)/\sin(\omega T/2)) \cdot \\ &\quad \sin(\omega t_m - n\omega T/2)\end{aligned} \quad (12)$$

Further, by allowing such sampling data to be passed through digital filter of the succeeding stage $(1 + Z^{-1})$, current $i'_{sm}$ at the time point $t_m$ is as indicated by the following equation.

$$\begin{aligned}i_{sm} &= i'_{sm} + i'_{sm-1} \\ &= I \cdot (\sin((n+1)\omega T/2)/\sin(\omega T/2)) \cdot \\ &\quad (\sin(\omega t_m - n\omega T/2) + \sin(\omega t_m - \omega T - n\omega T/2)) \\ &= 2I \cdot (\sin((n+1)\omega T/2)/\tan(\omega T/2)) \cdot \\ &\quad \sin(\omega t_m - (n+1)\omega T/2)\end{aligned} \quad (13)$$

Also with respect to the voltage, expansion can be similarly made. When the current $i = I \cdot \sin(\omega t)$ is caused to be passed through the difference filter, current $i_{jm}$ at time point tm is as indicated by following equation (14).

$$i_{jm} = I \cdot (\sin(\omega t_m - k\omega T) - \sin(\omega t_m - q\omega T)) \quad (14)$$
$$= 2I \cdot \sin((q-k)\omega T/2) \cdot \cos(\omega t_m - (k+q)\omega T/2)$$

Also with respect to the voltage, expansion can be similarly made. In this case, if the equations (12) and (13) have the relationship that they are orthogonal to each other in terms of vector, k+q=n+1 holds.

Moreover, if value as close as to 1 is selected in the fundamental wave so that quantity which determines magnitudes of the right side of the equation (14) does not become |sin((q−k)ωT/2|<<1, performance of the frequency characteristic can be ensured in the state where noise error is not amplified. For example, let consider the case where k=0 and q=n+1. At this time, the equation (14) is expressed as follows.

$$i_{jm} = 2I \cdot \sin((n+1)\omega T/2) \cdot \cos(\omega t_m - (n+1)\omega T/2) \quad (15)$$

Further, substitution of the relationship of the equation (15) and the equation (13) into the equation gives the following equation.

$$X_m = \frac{V}{I \cdot \tan(\omega T/2)} \cdot \sin(\theta) \quad (16)$$

Accordingly, if n is caused to be sufficiently greater value, influence of noise error on the current data of the equation (15) can be lessened, and the frequency characteristic performance with respect to the fundamental wave of $X_m$ can satisfy the characteristic of FIG. 2. $X_m/X$ (value in terms of the fundamental wave)=tan $(\omega_0 T/2)$/tan $(\omega T/2)$.

As described above, in accordance with this invention, even if harmonic components are superimposed on fault current/voltage produced at the times of failure of the power system, input data is caused to be passed through predetermined digital filters of which characteristics are orthogonal to each other in terms of vector in a broad frequency band, thereby making it possible to approximately solve, with high accuracy, a predetermined differential equation. Thus, high accuracy protective relay system can be realized.

BRIEF DESCRIPTION OF THE DRAWINGS

In the accompanying drawings:

FIG. 11 is a characteristic diagram showing offset mho characteristic on the impedance plane in the protective relay system according to the fifth embodiment of this invention;

FIG. 15 is a block diagram showing the configuration of the protective relay system according to the seventh embodiment (eighth aspect) of this invention;

BEST MODE FOR CARRYING OUT INVENTION

Preferred embodiments of a protective relay system according to this invention will now be described in detail with reference to the attached drawings.

Prior to description of the embodiments of the protective relay system according to this invention, the fundamental concept of this invention will now be described with reference to FIG. 3.

Figure 3:
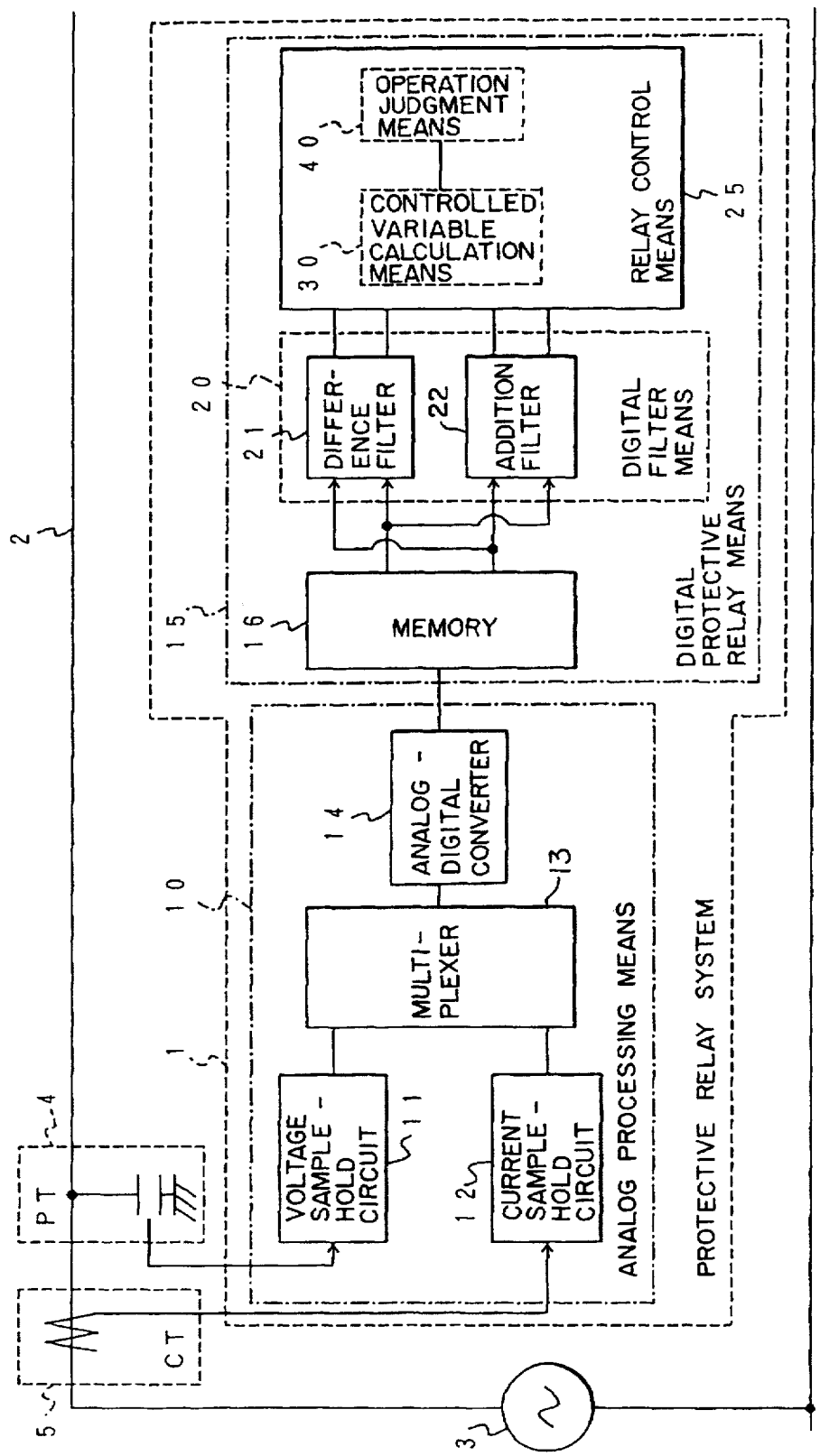
FIG. 3 is a block diagram showing the fundamental configuration of the protective relay system according to this invention.

FIG. 3 is a block diagram showing the entirety of a power system provided in the protective relay system. In FIG. 3, the protective relay system 1 is connected to a transmission line 2 comprising an a.c. power supply 3, a potential transformer (PT) 4 and a current transformer (CT) 5. The potential transformer 4 is voltage transformer used for measuring high voltage to measure voltage at a certain point of the transmission line 2. The current transformer 5 is an instrument transformer to measure a current at a certain point of the transmission line 2. The voltage and the current are the above-described first and second electric variables.

The protective relay system 1 comprises analog processing means 10 for processing analog data relating to voltage and current measured at plural sampling points continuous in time series manner, and digital protective relay means 15 for carrying out protective relay operation on the basis of digital data obtained by allowing the analog data to undergo analog-digital conversion.

The analog processing means 10 comprises a voltage sample-hold circuit 11 for detecting, every predetermined sampling time, voltage at a certain point of the transmission line 2 measured by the potential transformer 4, a current sample-hold circuit 12 for detecting, every sampling time, current at a certain point of the transmission line 2 measured by the current transformer 5, a multiplexer 13 for multiplexing or selecting voltage data and current data of time series respectively outputted from the voltage sample-hold circuit 11 and the current sample-hold circuit 12 to output them, and an analog-to-digital converter 14 for converting voltage data and current data delivered from the multiplexer 13 from analog signal to digital signal to deliver it to the digital protective relay system 15.

The digital protective relay system 15 comprises a memory 16 for temporarily storing respective digital data relating to voltage and current delivered from the analog/digital converter 14 of the analog processing means 10, digital filter means 20 for allowing voltage and current digital data as first and second electric variables delivered from the memory 16 to respectively undergo filtering (processing) to obtain output necessary for control, and relay control means 30 for determining controlled variable of the relay operation on the basis of plural outputs from the digital filter means 20.

The digital filter means 20 comprises a difference filter 21 for outputting first difference electric variable data which is difference between at least two sample data of plural sample data with respect to voltage as the first electric variable and second difference electric variable data which is difference between at least two sample data of plural data as the second electric variable at plural sampling times of the time series, and an addition filter 22 for outputting first and second additive electric variable data which are data respectively orthogonal to the first and second difference electric variable data in terms of vector. In more practical sense, the differential filter 21 is a filter in which transfer function "$Z^{-k}-Z^{-q}$" (Z is Z transform operator, and k<q) is used to output voltage data $v_{jm}$ and current data $i_{jm}$ which serve as the first and second difference electric variable data at a certain sampling time $t_m$, and voltage data $v_{jm-p}$ and current data $i_{jm-p}$ at any other sampling time $t_{m-p}$. Moreover, the addition filter 22 is a filter in which transfer function "$(1+Z^{-1}+Z^{-2}+\ldots+Z^{-n})(1+Z^{-1})$" ("n+1=k+q") is used to output voltage data $v_{sm}$ and current data $i_{sm}$ serving as the first and second additive electric variable data at the certain sampling time $t_m$, and voltage data $v_{sm-p}$ and current data $i_{sm-p}$ at the other sampling time point $t_{m-p}$.

Further, the relay control means 30 comprises controlled variable calculation means 31 for calculating relay controlled variable including at least one of reactance value, ohm value, operation/suppression quantity on the basis of the voltage data $v_{jm}$ and $V_{jm-p}$ and the current data $i_{jm}$ and $i_{jm-p}$ outputs of the difference filter of the digital filter means, and the voltage data $v_{sm}$ and $v_{sm-p}$ and the current data $i_{sm}$ and $i_{sm-p}$ which are outputs of the addition filter, and operation judgment means 32 for judging whether or not the value of the relay controlled variable calculated by the controlled variable calculating means has a predetermined relationship with respect to predetermined setting value and constant. By such a configuration, the relay control means calculates controlled variable of the relay operation in the power system on the basis of the first and second difference electric variable data at a certain sampling time, first and second additive electric variable data at the certain sampling time, first and second difference electric variable data at any other sampling time, and first and second additive electric variable data at the other sampling time to judge, on the basis of the controlled variable, the operation as to whether or not protection of the power system should be carried out, thus making it possible to control the relay operation of the power system.

The gist of this invention resides in that there is used digital filter means comprising difference filter 21 using the transfer function "$(Z^{-k}-Z^{-q})$" and addition filter 22 operative while correlating with the operational action of the difference filter 21, and using the transfer function "$(1+Z^{-1}+Z^{-2}+\ldots+Z^{-n})(1+Z^{-1})$". The first to ninth embodiments (first to tenth aspects) are characterized in that the kinds of controlled variables calculated by using respective outputs of the filters 21, 22 constituting the digital filter means are respectively different in various manners.

Explanation will now be given in detail in connection with digital protective relay means by different configurations caused to corresponding to different kinds of controlled variables, e.g., reactance value, ohm value, respective operation/suppression quantities, polarity voltage, and charge current compensation quantity, etc.

Figure 4:
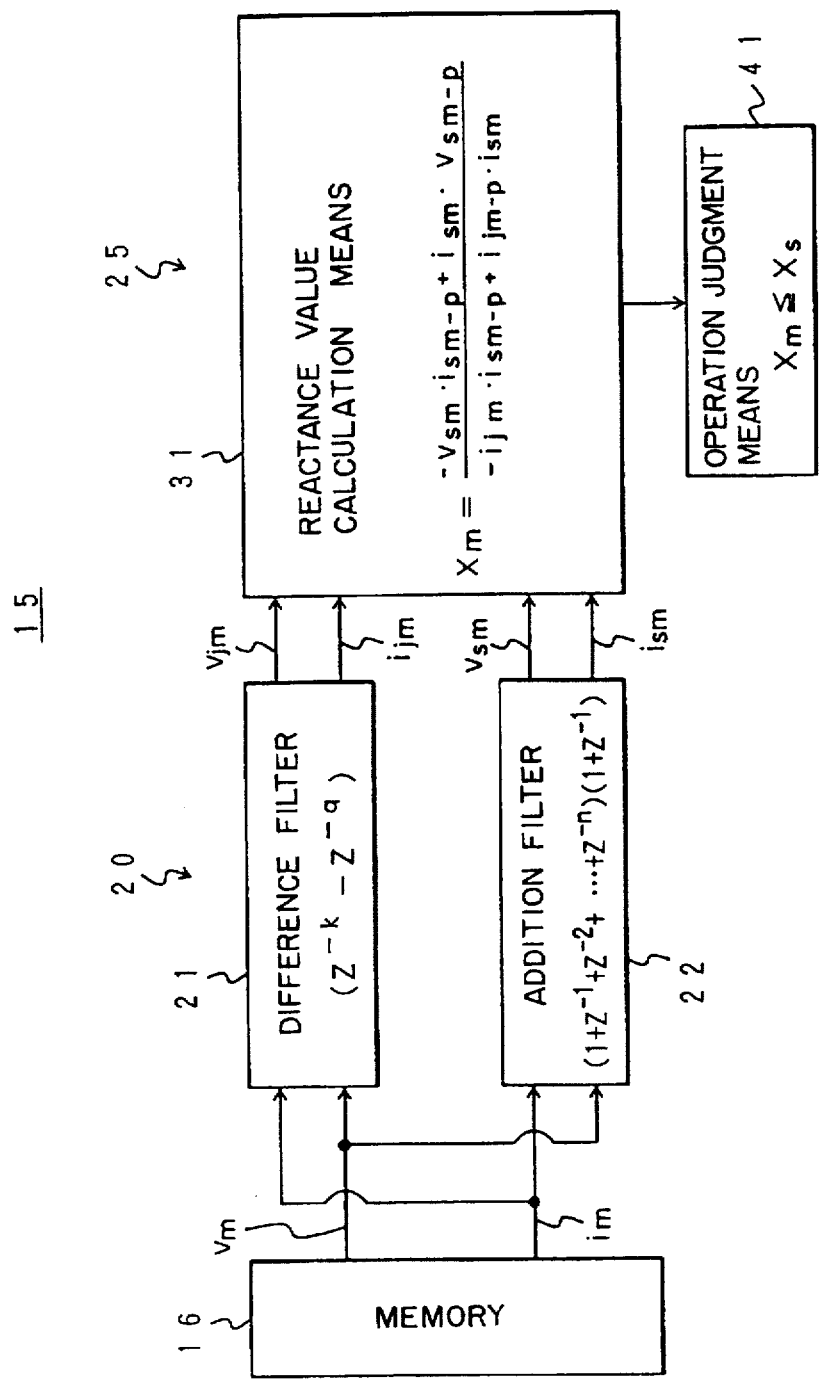
FIG. 4 is a block diagram showing the configuration of the protective relay system according to a first embodiment (first aspect) of this invention.

FIG. 4 is a block diagram of the first embodiment for explaining the protective relay system according to the first aspect of this invention This invention is characterized in that a measure is taken such that even if the sampling period is reduced, noise error included in data of differential quantity is not amplified, thereby making it possible to ensure performance of the frequency characteristic indicated by the equation (14). In FIG. 4, reference numeral 21 denotes a digital difference filter for extracting predetermined frequency components of voltage and current of power system (not shown) subject to protection, and reference numeral 22 denotes a digital addition filter for extracting voltage and current orthogonal to output data of the difference filter 21 in terms of vector even with respect to all frequency components. Moreover, reference numeral 31 denotes reactance value calculation means for calculating reactance, and reference numeral 41 denotes operation judgment means for judgment of operation.

Sample values $v_m$, $i_m$ at time $t_m$ of voltage v and current i of the power system are inputted to the addition filter 22 of FIG. 4 to allow them to be passed through a filter having transfer function $(1+Z^{-1}+Z^{-2}+\ldots+Z^{-n})(1+Z^{-1})$ (Z indicates Z transform operator) to thereby obtain voltage $v_{sm}$, current $i_{sm}$. Further, the sample values $v_m$, $i_m$ are inputted to the difference filter 21 to allow them to be passed through a filter having transfer function $(Z^{-k}-Z^{-q})$ (d+q=n+1; k<q) to thereby voltage $v_{jm}$, current $i_{jm}$.

The reactance value calculation means 31 calculates reactance value $X_m$ on the basis of the following equation (11) from voltage $v_{sm}$ and current $i_{sm}$ obtained at the addition filter 22 and voltage $v_{jm}$ and current $i_{jm}$ obtained at the differential filter at time $t_m$, and voltage $v_{sm-p}$, current $i_{sm-p}$ obtained from the addition filter 22 and voltage $v_{jm-p}$ and current $i_{jm-p}$ obtained from the differential filter 21 at time $t_{m-p}$. Further, the operation judgment means 41 judges, from the reactance value $X_m$ obtained at the reactance value calculation means 31 and setting value $X_s$, whether or not $X_m \leq X_s$ hold to conduct judgment of operation such that if the above relationship holds, the protective relay is in operative state, while it does not hold, the it is inoperative state.

$$X_m = \frac{-v_{sm} \cdot i_{sm-p} + i_{sm} \cdot v_{sm-p}}{-i_{jm} \cdot i_{sm-p} + i_{jm-p} \cdot i_{sm}} \quad (11)$$

Functions of respective digital filters are represented by using Z transform operator in a manner as indicated by the following equation. It is to be noted that since orthogonal relationship is described in detail in the Disclosure of the Invention, explanation thereof is omitted here (there holds the relationship that the addition filter 22 is lag by 90 degrees with respect to the difference filter 21).

$(1+Z^{-1}+Z^{-2}+\ldots+Z^{-n})(1+Z^{-1})$ $(Z^{-k}-Z^{-q})$ (In this case, $k+q=n+1$)

Further, in the case where setting is made such that $k=0$, $q=n+1$ in the difference filter 21, the transfer function of the addition filter 22 may be caused to be $(1+Z^{-1}+Z^{-2}+\ldots+Z^{-n})$ $(1-Z^{-1})$, $(=1-Z^{-n-1})$. Moreover, it is apparent that this configuration and the configuration of the addition filter 22 can be realized by divisional configuration consisting of three digital filters. Namely, input voltage and current are caused to be first passed through the first filter of the following equation to input its output to two filters, i.e., a second filter and a third filter, thus making it possible to obtain an output equivalent to the differential filter and the additive filter 22.

First filter: $(1+Z^{-1}+Z^{-2}+\ldots+A^{-n})$

Second filter: $(1+Z^{-1})$

Third filter: $(1-Z^{-1})$

Figure 1:
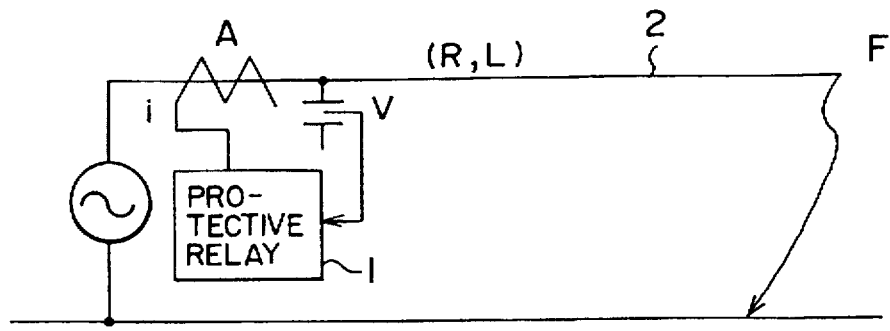
FIG. 1 is a block circuit diagram showing power system to which a protective relay system according to this invention is applied.
Figure 2:
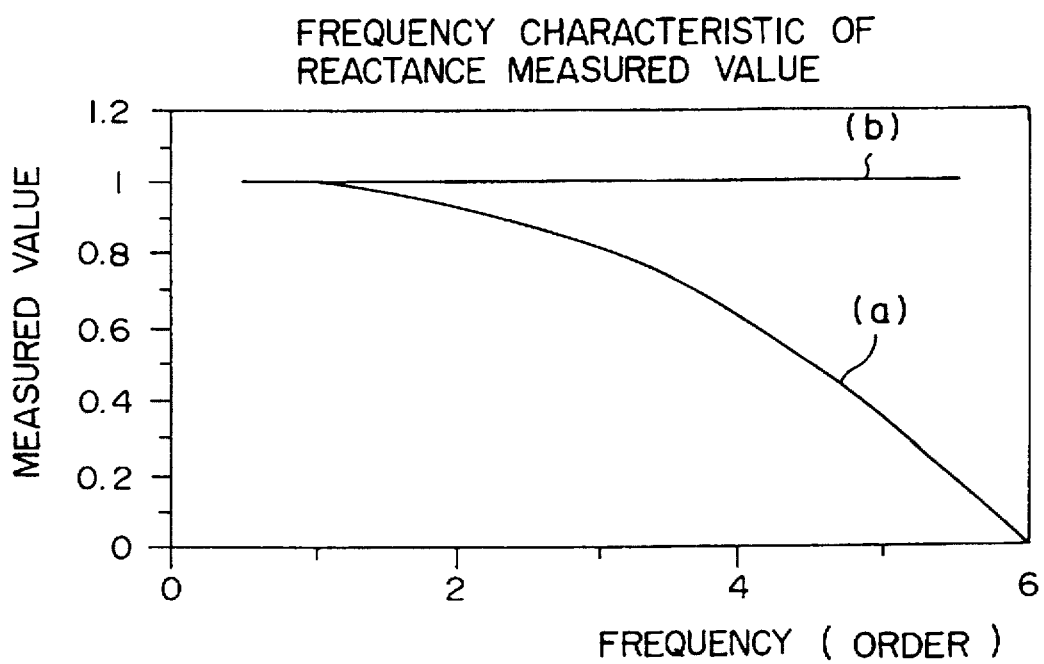
FIG. 2 is a characteristic diagram showing an example of frequency characteristic of reactance measured value for explaining protective operation in protective relay system according to this invention.

The reactance value calculation means 31 of FIG. 4 is means for calculating reactance value from the protective relay installation point up to fault point of the transmission line of FIG. 1 by the equation (11). When input voltage and current of the differential filter 21 and the addition filter 22 are expressed as $i=I\cdot\sin(\omega t)$, $v=V\cdot\sin(\omega t+\theta)$, the equation (11) can be represented by the equation (16).

The operation judgment means 41 makes a correction as indicated by $X_m \leq X_s/\tan(\omega_0 \cdot T/2)$ by $X_m$ calculated at the reactance value calculation means 31, setting value $X_s$ and constant $\tan(\omega_0 T/2)$ at the fundamental wave determined in advance to judge whether or not the protective relay is operative. It is to be noted that, in the description of the gist of this invention, description of plural collating operations of the operation judgments is omitted here.

The protective relay system of the second embodiment corresponding to the second aspect will now be described.

Figure 5:
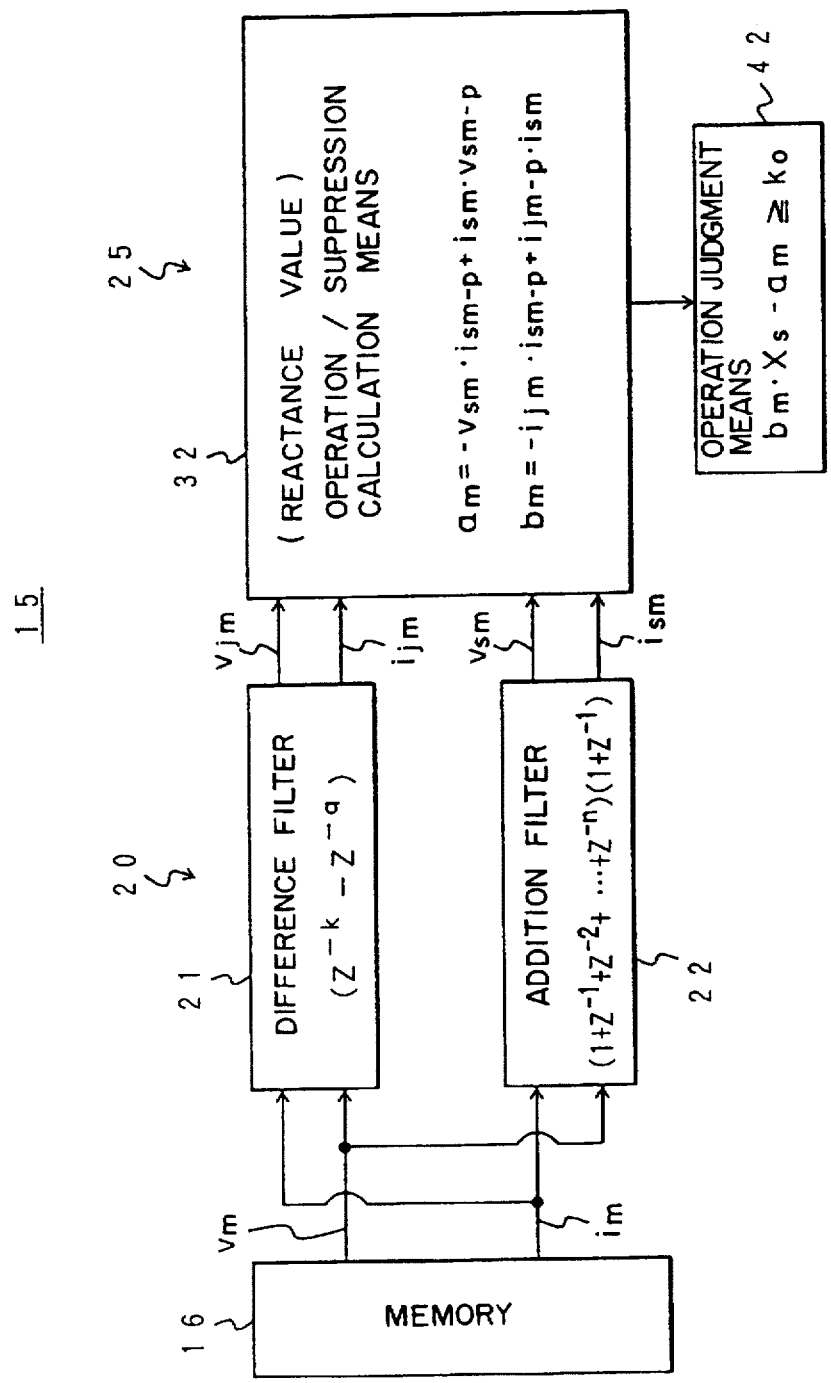
FIG. 5 is a block diagram showing the configuration of the protective relay system according to a second embodiment (second aspect) of this invention.

FIG. 5 is a block diagram showing the configuration of the protective relay system according to the second embodiment of this invention.

In the second embodiment, in place of the reactance value calculation means 41 of FIG. 4, reactance value operation/ suppression quantity calculation means 42 for calculating the following equation (17) is applied.

$$a_m = -v_{sm} \cdot i_{sm-p} + i_{sm} \cdot v_{sm-p} \quad b_m = -i_{jm} \cdot i_{sm-p} + i_{sm-p} \cdot i_{sm} \quad (17)$$

When current input and voltage input of the digital filter 20 consisting of difference filter 21 and addition filter 22 of FIG. 4 are respectively expressed as $i=I\cdot\sin(\omega t)$, $v=V\cdot\sin(\omega t+\theta)$, the above equation is represented by the following equation (18).

$a_m = 4 \cdot I \cdot v \cdot \{\sin((n+1)\omega T/2)\}/\tan(\omega T/2)\}^2 \cdot \sin(\theta) \cdot \sin(p\omega T)$ $b_m = 4 \cdot I^2 \cdot \{\sin((n+1)\omega T/2)\}^2/\tan(\omega t/2) \cdot \sin(p\omega T)$ (18)

Figure 6:
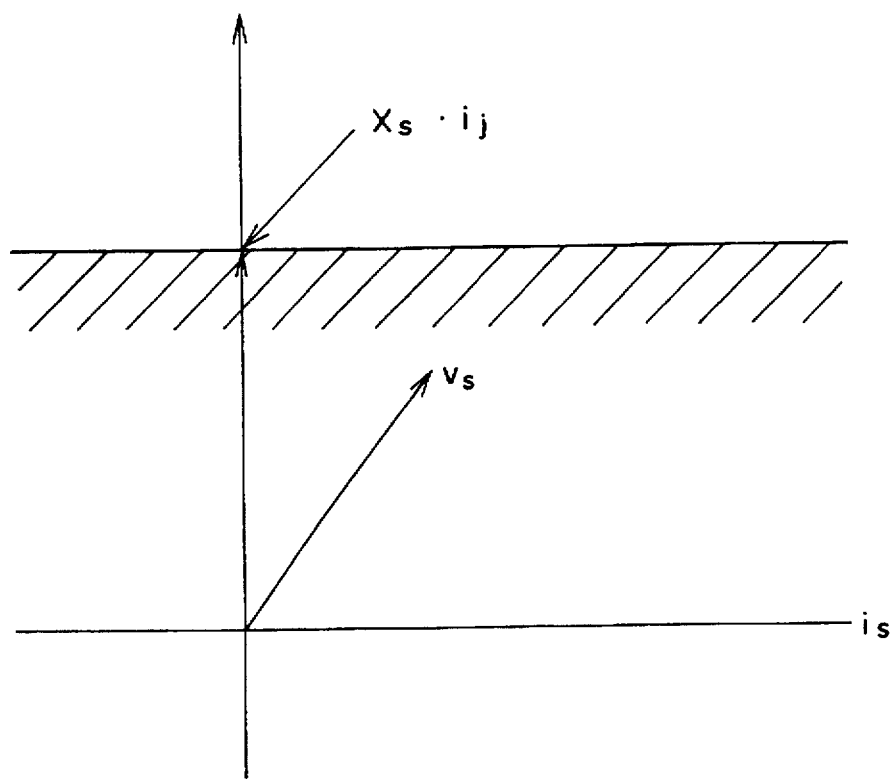
FIG. 6 is a characteristic diagram showing reactance characteristic on the impedance plane in the protective relay system according to the first and second embodiments of this invention.

The operation judgment means 42 is of a structure to make a correction of reactance setting value $X_s$ such that "$X_s \leftarrow X_s/\tan(\omega_0 T/2)$" to carry out judgement of operation on the basis of discriminant expressed as "$b_m \cdot X_s - a_m \geq K0$" (K0 is sensitivity constant). The protective relay of the second embodiment is protective relay having reactance characteristic similar to FIG. 4, and differs from the system disclosed in the first embodiment of FIG. 4 only in the technique for realization. The reactance characteristic diagram is shown in FIG. 6.

Figure 7:
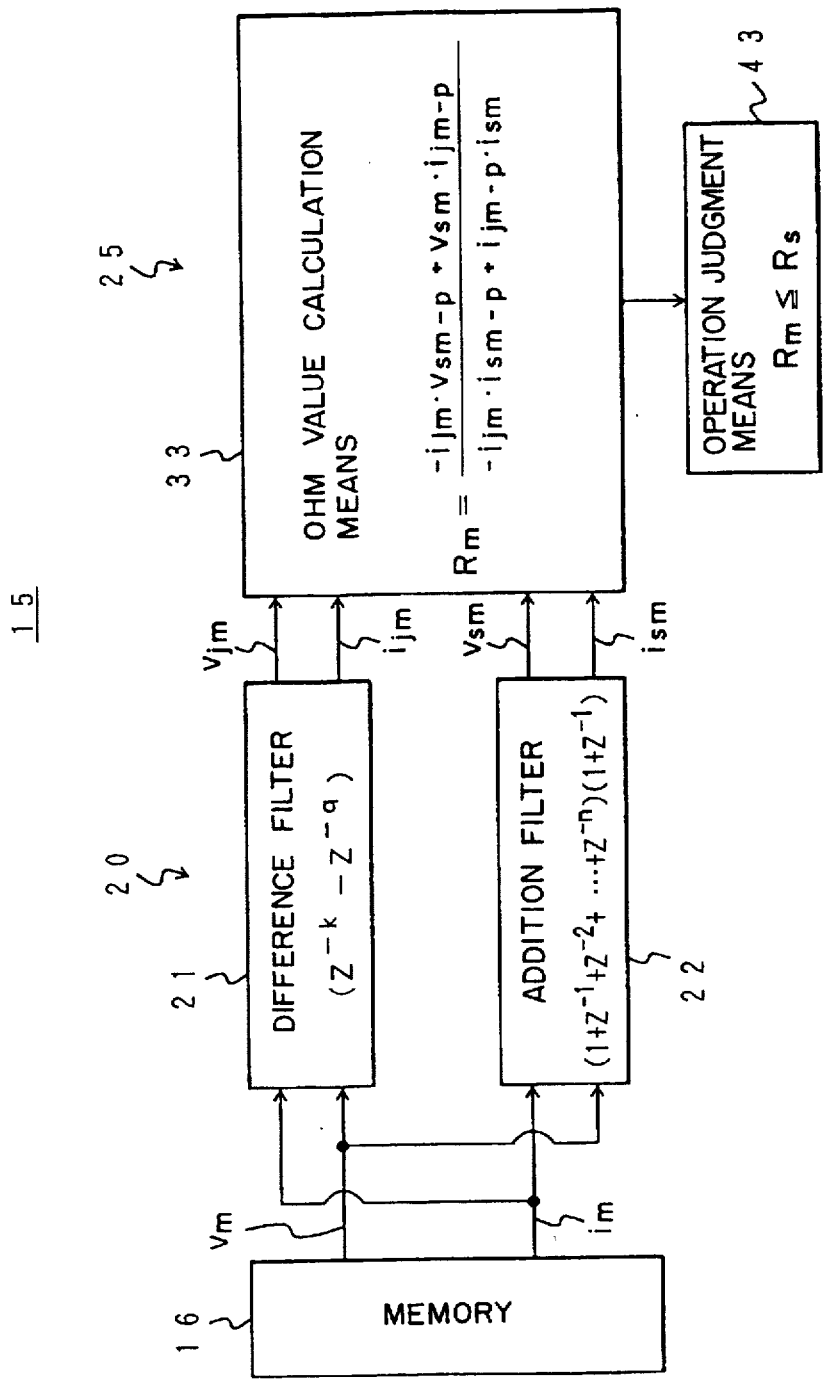
FIG. 7 is a block diagram showing the configuration of the protective relay system according to the third embodiment (third aspect) of this invention.

FIG. 7 is a block diagram showing the configuration of the protective relay system according to the third embodiment corresponding to the third aspect.

In the third embodiment, ohm value calculation means 33 for calculating the equation (c) is applied as the controlled variable calculation means 30.

In accordance with this equation, when current and voltage inputs of the digital filter 20 consisting of difference filter 21 and addition filter 22 of FIG. 4 are respectively expressed as $i=I\cdot\sin(\omega t)$ and $v=V\cdot\sin(\omega t+\theta)$, $-i_{jm}\cdot v_{sm-p} + v_{sm}\cdot i_{jm-p} = 4\cdot I \cdot V \cdot \{\sin((n+1)\omega T/2)\}^2/t$ an $(\omega T/2)\cdot\cos(\theta)\cdot\sin(P\omega T)$. Further, from the relationship of the equation (18), the following equation is obtained:

$R_m = (I/V)\cos(\theta)$ (19)

The operation judgment means 43 is of a structure to judge the relationship in, magnitude between the ohm value calculated by the equation (19) and the setting value $R_s$ to judge the protective relay to be operative when "$R_m \leq R_s$" holds.

Figure 8:
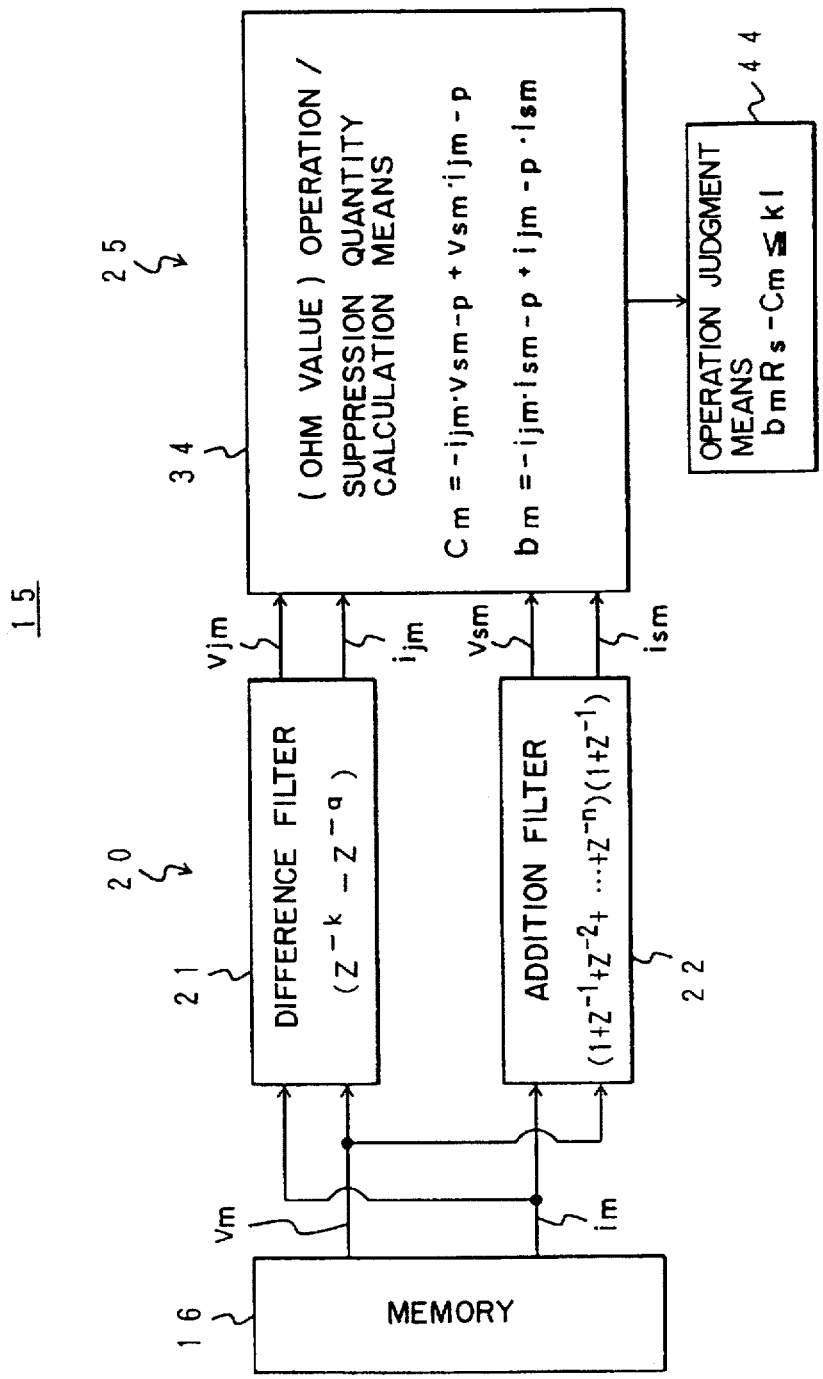
FIG. 8 is a block diagram showing the configuration of the protective relay system according to the fourth embodiment (fourth aspect) of this invention.

FIG. 8 is a block diagram showing the configuration of the protective relay system according to the fourth embodiment corresponding to the fourth aspect of this invention. In the fourth embodiment, ohm value operation/suppression quantity calculation means 34 for calculating the equation (D) is applied as the controlled variable calculation means 30.

In the fourth embodiment, when current and voltage inputs of digital filter 20 consisting of differential filter 21 and addition filter 22 of FIG. 3 are respectively expressed as $i=I\cdot\sin(\omega t)$ and $v=V\cdot\sin(\omega t+\theta)$, $c_m = i_{jm}\cdot v_{sm-p} + v_{sm}\cdot i_{jm-p} = 4\cdot I \cdot v \cdot \{\sin((n+1)\omega T/2)\}^2/\tan(\omega T/2)\cdot\cos(\theta)\cdot\sin(P\omega T)$. Additionally, $b_m$ is the same variable as that in the second embodiment shown in FIG. 5.

Figure 9:
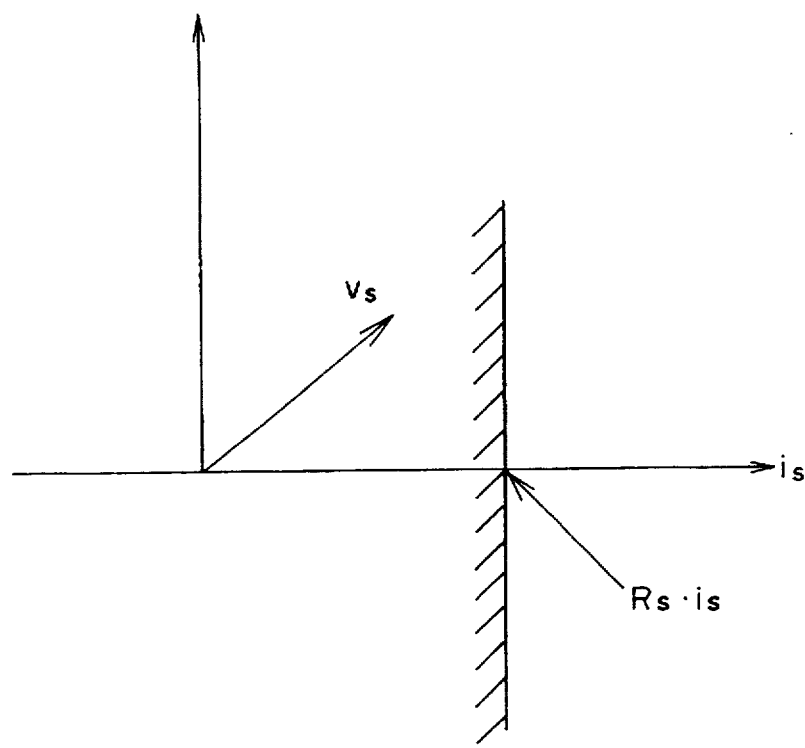
FIG. 9 is a characteristic diagram showing ohm characteristic on the impedance plane in the protective relay system according to the fourth embodiment of this invention.

The operation judgment means 44 is of a structure to carry out operation judgment on the basis of $b_m \cdot R_s - c_m \geq k1$ from ohm setting value Rs, sensitivity constant K1 and outputs $c_m$, $b_m$ of the operation/suppression quantity calculation means 34. The protective relay of this embodiment is a protective relay having ohm characteristic in a manner similar to FIG. 5, and differs from the system disclosed in the second embodiment only in the technique for realization. The ohm characteristic diagram is shown in FIG. 9.

Figure 10:
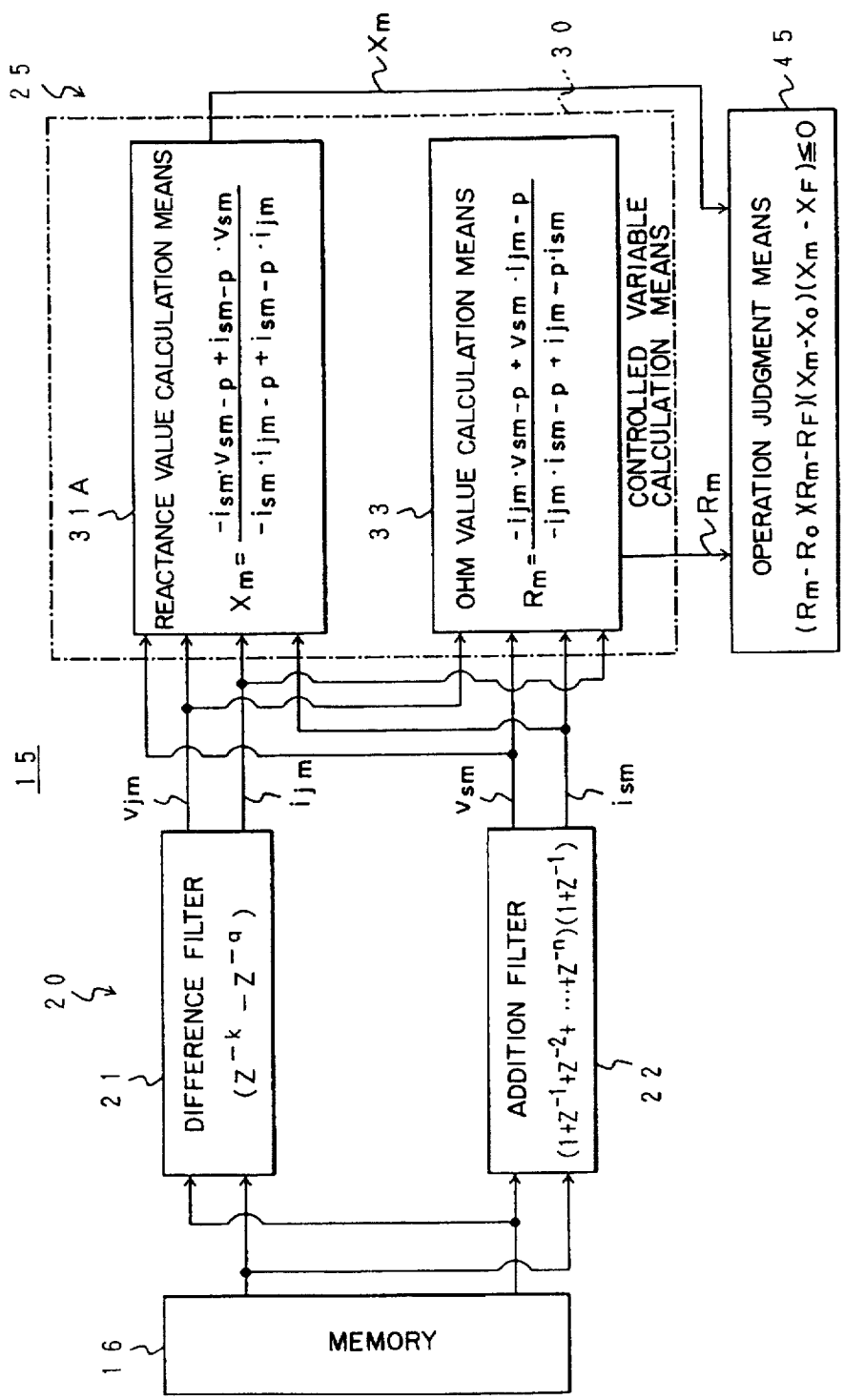
FIG. 10 is a block diagram showing the configuration of the protective relay system according to a fifth embodiment (fifth aspect) of this invention.

FIG. 10 is a block diagram showing the configuration of the protective relay system according to the fifth embodiment corresponding to the fifth aspect of this invention. The protective relay of the fifth embodiment is combination of the protective relays which have been already described.

Namely, this system comprises controlled variable calculation means 30 including reactance value calculation means 31 for carrying out an operation described below, $$"X_m = \frac{-i_{sm} \cdot v_{sm-p} + i_{sm-p} \cdot v_{sm}}{-i_{sm} \cdot i_{jm-p} + i_{sm-p} \cdot i_{jm}}"$$

which is equivalent to that of the reactance value calculation means 31 in the protective relay system of the first embodiment shown in FIG. 4, and ohm value calculation means 33 in the third embodiment shown in FIG. 7. Accordingly, output to the operation judgment means 45 of the controlled variable calculation means 30 is reactance value $X_m$ and ohm value $R_m$.

The operation judgment means 45 judges whether or not the protective relay is operative, on the basis of discriminant "$(R_m - R_0)\cdot(R_m - R_F) + (X_m - X_0)\cdot(X_m - X_F) \leq 0$" from output Xm of a reactance value calculating means 31A and output Rm of ohm value calculation means 33. In this case, $R_0$, $X_0$ and $R_s$, $X_s$ are as indicated below.

offset mho:
- near side setting value ($R_0$ (ohm component) $X_0$ (reactance component)).
- far side setting value ($R_F$ (ohm component) , $X_F$ (reactance component)).

The protective relay of the fifth embodiment is protective relay having offset mho characteristic. The offset mho characteristic diagram is shown in FIG. 11.

The sixth to eighth embodiment of this invention will now be described. These three embodiments respectively correspond to the seventh to ninth aspects, and are conceptually included within the sixth aspect as the higher rank concept.

Accordingly, the controlled variable calculation means is comprised of polarity voltage preparation means for preparing polarity voltage $v_{pjm}$ having a predetermined relationship with respect to these voltage data $v_{jm}$ and/or $v_{sm}$ on the basis of the voltage data $v_{jm}$ which is output of the difference filter and voltage data $v_{sm}$ which is output of the addition filter. The predetermined relationship is somewhat different in the sixth to eighth embodiments.

Moreover, the operation judgment means judges whether or not the following discriminant (F) holds, on the basis of voltage data $v_{jm}$ and current data $i_{jm}$ which are outputs of the difference filter, voltage data vsm and current data $i_{sm}$ which are outputs of the additive filter, polarity voltage $v_{pjm}$ which is output of the polarity voltage preparation means, and setting values $R_s$ and $X_s$.

$$v_{pjm-p} \cdot \{(R_s \cdot i_{sm} + X_s \cdot i_{jm}) - v_{sm}\} - v_{pjm} \cdot \{R_s \cdot i_{sm-p} + x_s \cdot i_{jm-p}) - v_{sm-p}\} \geq K2 \quad (F)$$

Figure 12:
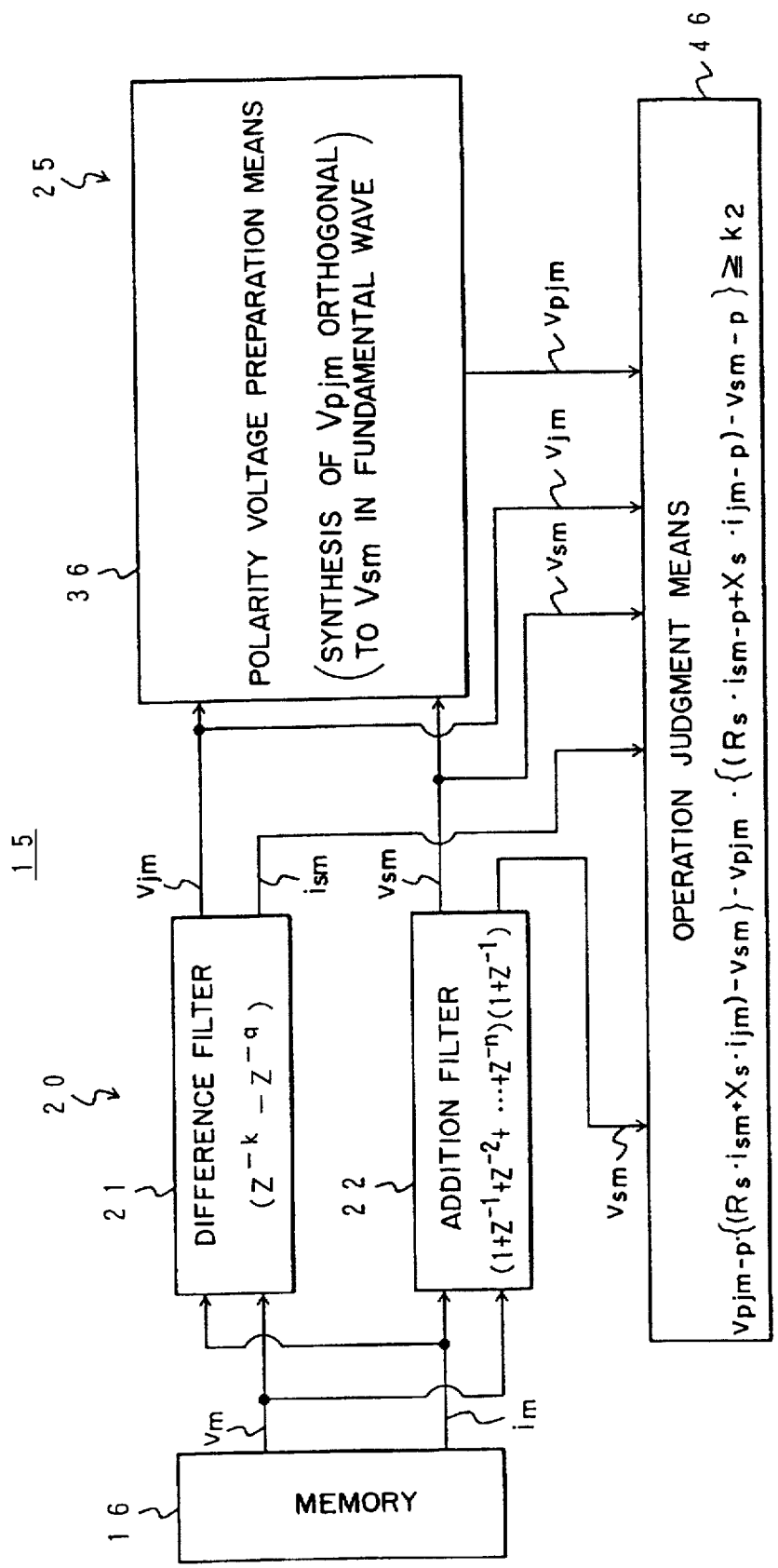
FIG. 12 is a block diagram showing the protective relay system according to the sixth embodiment (seventh aspect) of this invention.
Figure 13:
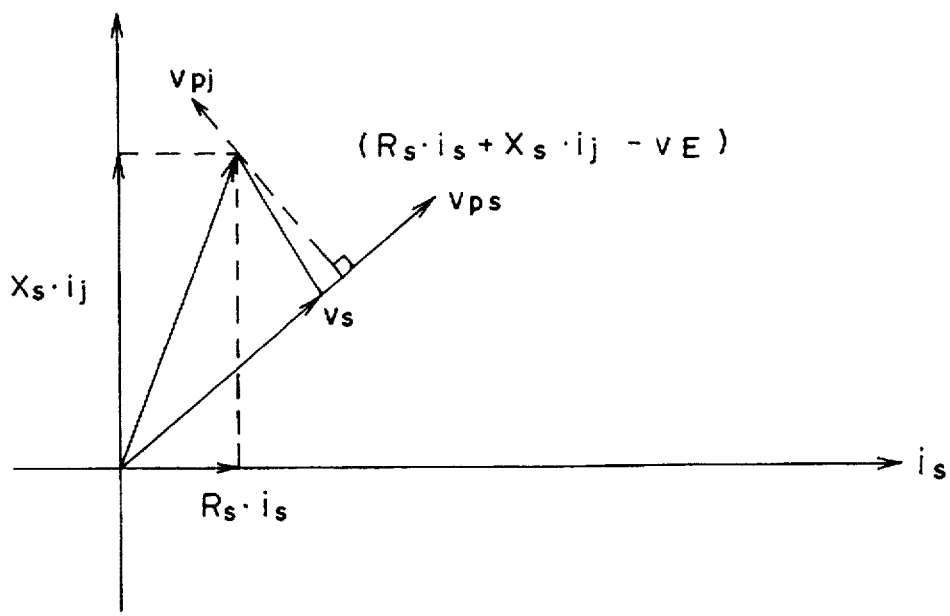
FIG. 13 is a characteristic diagram showing the relationship between the maximum sensitivity angle and setting impedance of the mho characteristic in the protective relay system according to the sixth embodiment of this invention.

FIG. 12 is a block diagram showing the configuration of the protective relay system according to the sixth embodiment corresponding to the seventh aspect. The protective relay of the sixth embodiment is combination of the protective relay already described. The polarity voltage preparation means 36 extracts voltage variable $v_{pjm}$ orthogonal to output vsm of the addition filter in terms of vector as controlled variable calculation means 30. The operation judgment means 46 judges, on the basis of the following equation, whether or not, whether or not the protective relay is operative. ($R_s$, $X_s$) are setting values of the ohm component and the reactance component. It is necessary to use $X_s$ after undergone correction of $X_s \leftarrow X_s/\tan(\omega_0 T/2)$. In the following equation (F), the electric variable of the portion of ($R_s \cdot i_{sm} + X_s \cdot i_{jm}$) leads by magnitude of $(R_2^2 + X_s^2)^{1/2}$ and phase $\phi = \tan^{-1}(X_s/R_s)$ with the current $i_{sm}$ being as reference. The relationship thereof is shown in FIG. 13.

$$v_{pjm-p} \cdot ((R_s \cdot i_{sm} + X_s \cdot i_{jm}) - v_{sm}) - v_{pjm} \cdot ((R_s \cdot i_{sm-p} + X_s \cdot i_{jm-p}) - v_{sm-p}) \geq K2 \quad (F)$$

When $i = I \cdot \sin(\omega t)$ and $v = V \cdot \sin(\omega t + \theta)$ are respectively substituted for input current and input voltage of the difference filter 21 and the addition filter 22 of the embodiment, the following equation is provided.

$$V_{pj} \cdot \{(R_s \cdot I_s \cdot \cos(\theta) + X_s/\tan(\theta_0 T/2) \cdot I_j \sin(\theta)) - V_s\} \cdot \sin(p\omega T) \geq K2$$

In this case, $I_s$, $V_s$ and $I_j$ are expressed as follows.

$I_s = 2I \cdot \sin((n+1)\omega T/2)/\tan(\omega T/2)$ $V_s = 2V \cdot \sin((n+1)\omega T/2)/\tan(\omega T/2)$ $I_j = 2I \cdot \sin((n+1)\omega T/2)$ When the above-mentioned equation is represented by the following relational expression is provided.

$$V_{pj} \cdot \{(Z_s \cdot I_s \cos(\theta)\cos(\phi) + Z_s \cdot I_j \cdot \sin(\theta)\sin(\phi)) - V_s\} \cdot \sin(p\omega T) =$$

$$V_{pj} \cdot \{Z_s \cdot I \cdot (\cos(\theta)\cos(\phi) + \sin(\theta)\sin(\phi))) - V_s\} \cdot \sin(p\omega T) =$$

$$V_{pj} \cdot \{Z_s \cdot I \cdot \cos(\theta - \phi) - V_s\} \cdot \sin(p\omega T) \geq K2$$

Figure 14:
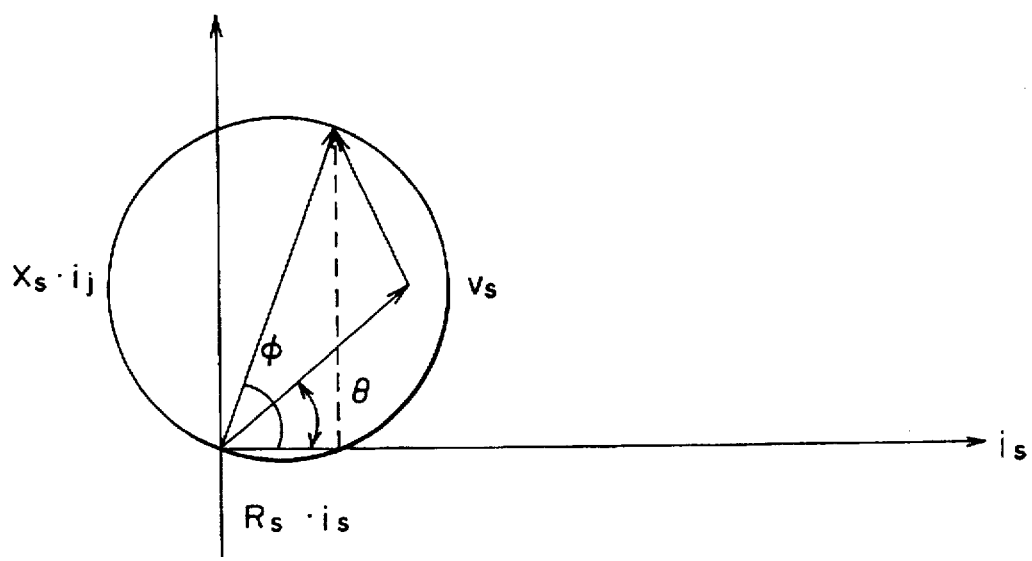
FIG. 14 is a characteristic diagram showing mho characteristic in which the relationship shown in FIG. 15 is represented by current reference.

The above-mentioned equation eventually the equation of the principle of operation of the mho characteristic. The mho characteristic is shown in FIG. 14.

FIG. 15 is a block diagram showing the configuration of the protective relay system according to the seventh embodiment corresponding to the eighth aspect of this invention. In FIG. 15, operation judgment means 47 is provided in place of the operation judgment means 46 shown in FIG. 12. In this embodiment, memory voltage earlier by predetermined cycle (data earlier by N samples) of voltage $v_{jm}$ orthogonal to the voltage $v_{sm}$ is caused to be polarity voltage. Namely, $$V_{pjm} = 2V \cdot \sin((n+1)\omega T/2) \cdot$$
$$\cos(\omega t_m + \theta - N\omega T - (n+1)\omega T/2$$

$$V_{sm} = 2V \cdot (\sin((n+1)\omega T/2)\tan(\omega T/2) \cdot$$
$$\sin(\omega t_m + \theta - (n+1)\omega T/2))$$

$(N\omega_0 T = 2\Pi M(M \text{ is integer}))$

Others are similar to those of FIG. 12.

Figure 16:
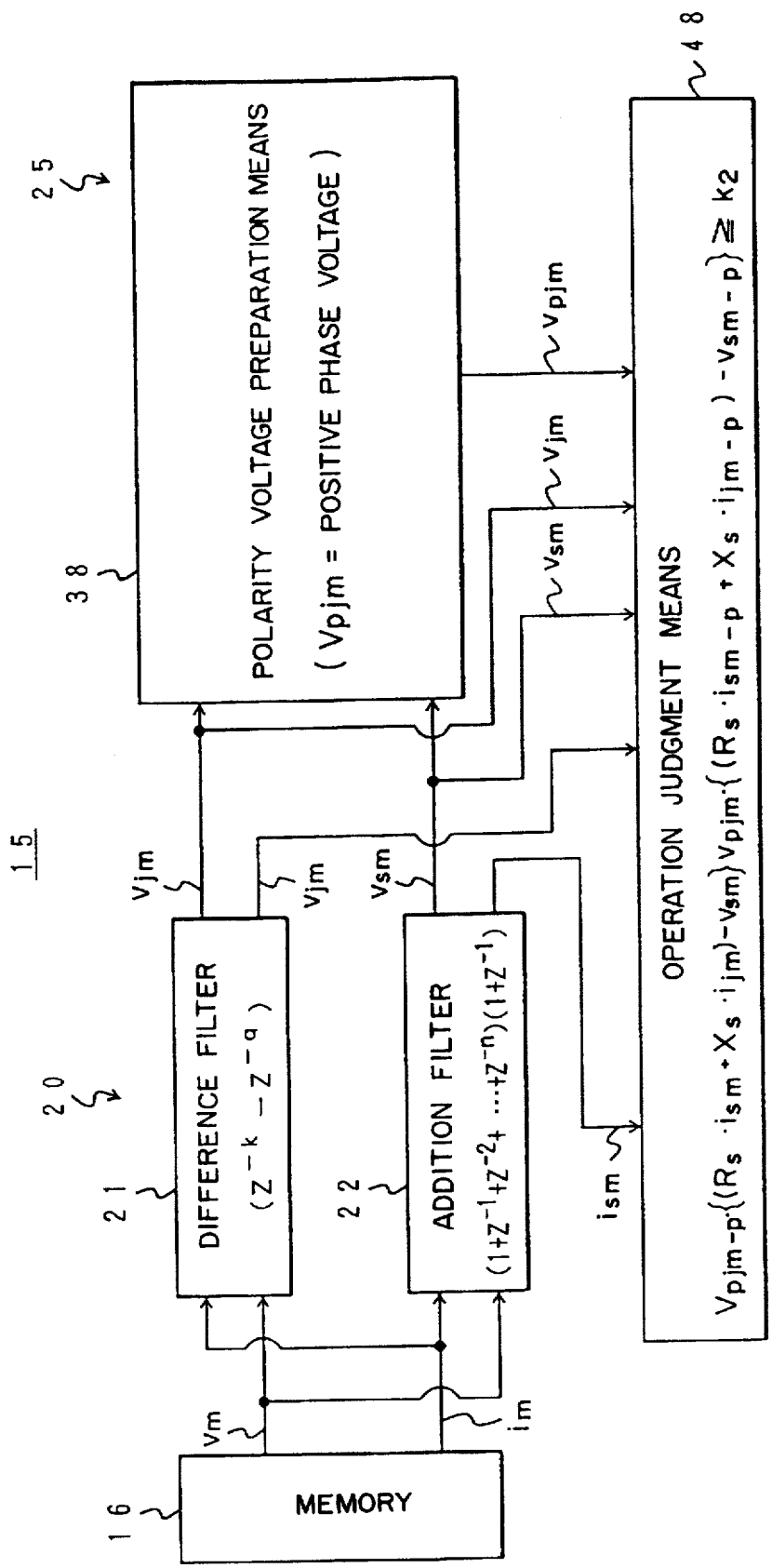
FIG. 16 is a block diagram showing the configuration of the protective relay system according to an eighth embodiment (ninth aspect) of this invention.

FIG. 16 is a block diagram showing the configuration of the protective relay system according to the tenth embodiment corresponding to the ninth aspect. In FIG. 16, operation judgment means 48 is provided in place of the operation judgment means 46 shown in FIG. 12. In this embodiment, as voltage $v_{pjm}$ orthogonal to the voltage vsm, if that voltage is voltage for detection of short circuit, e.g., in the case of AB phase, positive phase voltage having AB phase as reference is extracted (A, B, C represent respective phases of three-phase a.c. electric variable). The voltage $v_{pjm}$ can be extracted by $v_{pjm}$ (AB)=$3^{1/2} \cdot v_{sm}(c) + v_{jm}(AB)$.

Moreover, if positive phase voltage is voltage for grounding, the positive phase voltage having A phase as reference can be calculated by $v_{pjm}$ (A)=$3^{1/2} v_{jm}$ (A)−$v_{jm}$ (BC). In addition to the method in which predetermined (required) voltage vector is synthesized from two electric variables orthogonal to each other, a method in which the sampling time series is shifted by 90 degrees may be applied.

Figure 17:
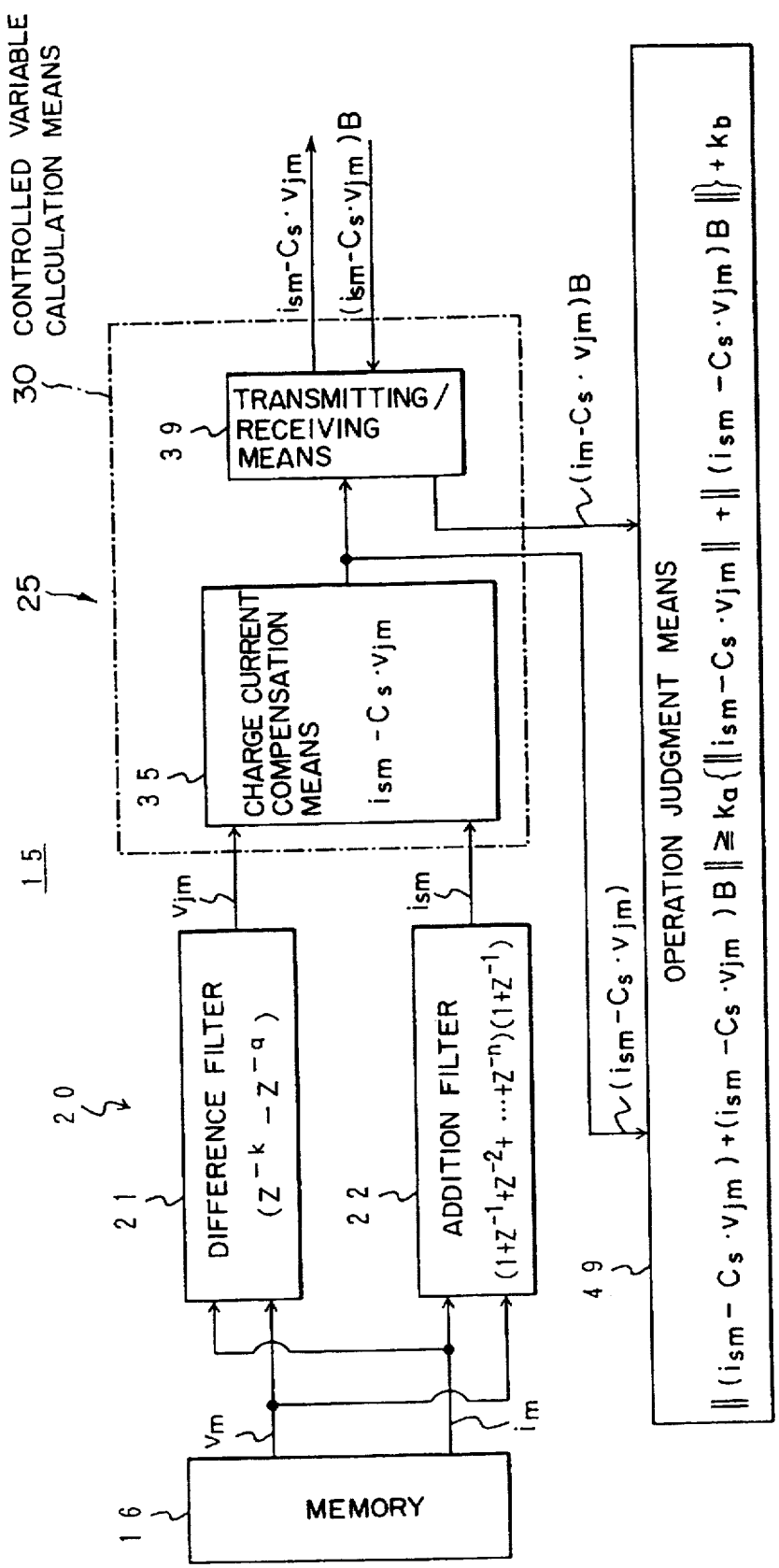
FIG. 17 is a block diagram sowing the configuration of the protective relay system according to a ninth embodiment (tenth aspect) of this invention.

FIG. 17 is a block diagram showing the configuration of the protective relay system according to the ninth embodiment corresponding to the tenth aspect of this invention. Charge current compensation means 35 makes a correction of setting value $C_s$ such that $C_s \leftarrow C_s/\tan(\omega_0 T/2)$ to calculate $i_{sm} - C_s \cdot v_{jm}$ from output ism of the additive filter 22 and output $v_{jm}$ of the differential filter 21. The $C_s \cdot v_{jm}$ is compensation component of current produced by the charge capacity $C_s$. The electric variable "$(i_{sm} - C_s \cdot v_{jm})$B" for the destination electric station B is received by transmitting/receiving means 39, and the electric variable of the terminal for source of transmission is transmitted to the B electric station.

The operation judgment means 49 carries out operation judgment on the basis of the following equation from vector sum current of current obtained by compensating charge current of the terminal for source of transmission provided by the charge current compensation means 35 and current obtained by compensating charge current of the destination electric station B terminal, i.e., scalar sum current of amplitude value of differential current and amplitude of current obtained by compensating charge currents of respective terminals. This equation is the operation principle equation of the ratio differential relay system well known as the transmission line differential protective relay $$\|(i_{sm} - C_s \cdot v_{jm}) + (i_{sm} - C_s \cdot v_{jm})B\| \geq ka \cdot \{\|i_{sm} - C_s \cdot v_{jm}\| + \|i_{sm} - C_s \cdot v_{jm})B\|\} + kb$$

where

∥a∥ indicates quantity proportional to amplitude value of a.c. electric variable a at time point of tm Ka is No. of ratio suppression digits (absolute number), and Kb is minimum sensitivity current.

Figure 18:
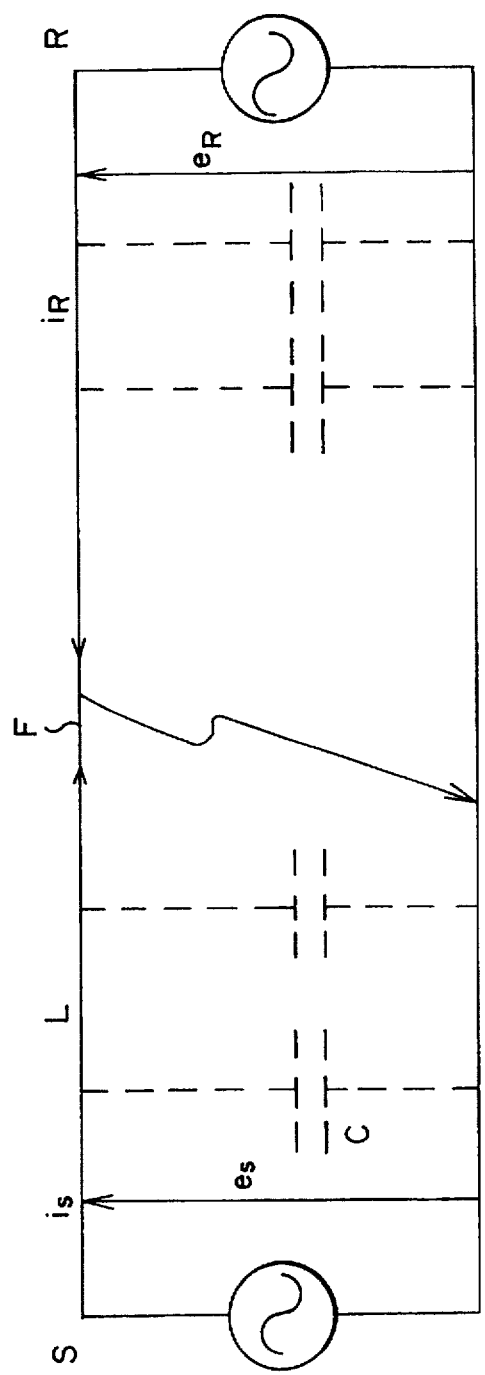
FIG. 18 is a circuit diagram of power transmission line for explaining transmission equation with respect to the charge current compensation in the protective relay system shown in FIG. 17.

The physical meaning of the charge current compensation of this equation will be described below with reference to the transmission line of FIG. 18. The well known transmission equation is indicated at the transmitting/receiving terminal.

forward wave: $i_{DF}(t)=i_s(t-\tau)+e_s(t-\tau)/z +i_R(t+\tau)-e_R(t+\tau)/z$ backward wave: $i_{DB}(t)=i_s(t-\tau)+e_s(t-\tau)/z +i_R(t+\tau)-e_R(t+\tau)/z$ differential current: $i_{DD}(t)=(i_{DF}(t)+i_{DB}(t))/2$ where suffix s is transmission terminal, R is charge terminal, Z is serge impedance=$(L/C)^{1/2}$ $\tau$ is propagation time=$1 \cdot (LC)^{1/2}$ Implementation of Taylor expansion approximation to the differential current $i_{DD}(t)$ under the condition of ($\tau \approx 0$) gives:

$$i_{DD}(t) = i_s(t) - (\tau/z)\frac{de_s(t)}{dt} + (\tau/2)\frac{d^2 i_s(t)}{dt} -$$

$$\left( \tau^3/(3!z)\frac{d^3 e_s(t)}{dt^3} + i_R(t) - (\tau/z)\frac{de_R(t)}{dt} + \right.$$

$$\left. (\tau^2/2)\frac{d^2 i_R(t)}{dt^2} - (\tau^3/(3!z))\frac{d^3 e_R(t)}{dt^3} \right)$$

$$i_{DD}(t) \approx i_s(t) - (\tau/z)\frac{de_s(t)}{dt} + i_R(t) - (\tau/z)\frac{de_R(t)}{dt} \perp$$

$\tau/z = \Sigma C/2(1/2$ of charge capacity of SR entire interval)

If differential current is extracted only by current vector sum current (is(t)+iR(t)) of the transmitting/receiving terminal, the previously described charge current component would be error current, leading to lowering of sensitivity of the differential relay. Accordingly, such error current is compensated so that only the fault current component can be extracted. It is apparent as previously described that this invention can be applied to the time differential equation of the above-mentioned equation. In addition, it is omitted that the meaning of the ratio differential system is described here.

INDUSTRIAL APPLICABILITY

In accordance with the protective relay system according to this invention, even if harmonic components are superimposed on fault current or fault voltage produced at the time of occurrence of failure of the power system, an approach is employed to approximate, with higher accuracy, a predetermined time differential equation by predetermined digital filters of which characteristics are orthogonal to each other in terms of vector in a broad frequency band. Accordingly, there is provided protective relay system of high accuracy free from influence of noise error in failure of the system. Thus, this protective relay system can be widely applied to power system including various power equipments, particularly equipments such as cable transmission line, phase modifying capacitor and the like.

What is claimed is:

1. A protective relay system adapted for detecting, in time series manner, a voltage variable and a current variable of a power system to discriminate on the basis of changes in the respective voltage and current values in the time series whether or not a fault portion of line or equipment included in the power system exists within a predetermined range, the protective relay system comprising:
  digital filter means including a difference filter for outputting voltage difference variable data indicative of difference between at least two sample data of plural sampling data of the voltage variable and current difference variable data indicative of difference between at least two sample data of plural sample data of the current variable at plural sampling times of the time series, and an addition filter for outputting voltage and current additive variable data indicative of data respectively orthogonal to the voltage and current difference variable data in terms of vector; and
  relay control means for calculating a reactance value of a relay operation in the power system on the basis of the voltage and current difference variable data at a certain sampling time point, voltage and current additive variable data at the certain sampling time point, the voltage and current difference variable data at any other sampling time point and the voltage and current additive variable data at the other sampling time point to judge, on the basis of said reactance value, the operation as to whether or not protection of the power system should be carried out.

2. A protective relay system adapted for detecting, in time series manner, a first electric variable and a second electric variable of a power system to discriminate on the basis of changes in the respective electric values in the time series whether or not a fault portion of line or equipment included in the power system exists within a predetermined range, the protective relay system comprising:
  digital filter means including a difference filter for outputting first difference electric variable data indicative of difference between at least two sample data of plural sampling data of the first electric variable and second difference electric variable data indicative of difference between at least two sample data of plural sample data of the second electric variable at plural sampling times of the time series, and an addition filter for outputting first and second additive electric variable data indicative of data respectively orthogonal to the first and second difference electric variable data in terms of vector; and
  relay control means for calculating controlled variables of a relay operation in the power system on the basis of the first and second difference electric variable data at a certain sampling time point, first and second additive electric variable data at the certain sampling time point, the first and second difference electric variable data at any other sampling time point and the first and second additive electric variable data at the other sampling time point to judge, on the basis of the controlled variables, the operation as to whether or not protection of the sower system should be carried out,
  wherein the difference filter is a filter in which transfer function $Z^{-k}-Z^{-q}$ (Z is Z transform operator and k<q) is used to output voltage data $v_{jm}$ and current data $i_{jm}$ serving as the first and second difference electric variable data at a certain sampling time $t_m$ and voltage data $v_{jm-p}$ and current data $i_{jm-p}$ at any other sampling time $t_{m-p}$, and the addition filter is a filter in which transfer function $(1+Z^{-1}+Z^{-2}+\ldots +Z^{-n})(1+Z^{-1})$ (where n+1=k+q) is used to output voltage data $v_{sm}$ and current data $i_{sm}$ serving as the first and second additive electric variable data at the certain sampling time $t_m$ and voltage data $v_{sm-p}$ and current data $i_{sm-p}$ at the other sampling time $t_{m-p}$.

3. A protective relay system as set forth in claim 2, wherein the relay control means includes
  controlled variable calculating means for calculating relay controlled variable including at least one of reactance value, resistance value and operation/suppression quantity on the basis of the voltage data $v_{jm}$ and $v_{jm-p}$ and the current data $i_{jm}$ and $i_{jm-p}$ which are outputs of the difference filter of the digital filter means and the voltage data $v_{sm}$ and $v_{sm-p}$ and the current data $i_{sm}$ and $i_{sm-p}$ which are outputs of the addition filter thereof; and operation judging means for judging whether or not value of the relay controlled variable calculated by the controlled variable calculation means has a predetermined relationship with respect to a predetermined setting value and constant.

4. A protective relay system as set forth in claim 3, wherein the controlled variable calculation means is constituted by reactance value calculation means for determining reactance value $X_m$ by the following equation (A) on the basis of the current data $i_{jm}$ and $i_{jm-p}$ which are outputs of the difference filter, and the voltage data $v_{sm}$ and $v_{sm-p}$ and the current data $i_{sm}$ and $i_{sm-p}$ which are outputs of the addition filter $$X_m = \frac{-v_{sm} \cdot i_{sm-p} + i_{sm} \cdot v_{sm-p}}{-i_{jm} \cdot i_{sm-p} + i_{jm-p} \cdot i_{sm}}, \tag{A}$$

wherein the operation judging means judges the discriminant $X_m \leq X_s$ from reactance value $X_m$ and setting value $X_S$ determined by the reactance calculating means.

5. A protective relay system as set forth in claim 3, wherein the controlled variable calculating means is constituted by operation/suppression quantity calculating means for calculating operation/suppression quantities $a_m$ and $b_m$ corresponding to the reactance value by the following equation (B) on the basis of the current data $i_{jm}$ and $i_{jm-p}$ which are outputs of the differential filter and the voltage data $V_{sm}$ and $V_{sm-p}$ and the current data $i_{sm}$ and $i_{sm-p}$ which are outputs of the additive filter:

$$bm = -i_{jm} \cdot i_{sm-p} + i_{jm-p} \cdot i_{sm} \tag{B}$$

and wherein the operation judging means judges discriminant $b_m \cdot X_s - a_m \geq KO$ from the operation/suppression quantities $a_m$ and $b_m$ determined by the operation/suppression quantity calculating means, and setting value $X_s$ and constant KO.

6. A protective relay system as set forth in claim 3, wherein the controlled variable calculation means is constituted by ohm value calculating means for determining ohm value $R_m$ by the following equation (C) on the basis of the current data $i_{jm}$ and $i_{jm-p}$ which are outputs of the difference filter and the voltage data $v_{sm}$ and $v_{sm-p}$ and the current data $i_{sm}$ and $i_{sm-p}$ which are outputs of the addition filter:

$$R_m = \frac{-i_{jm} \cdot v_{sm-p} + v_{sm} \cdot i_{jm-p}}{-i_{jm} \cdot i_{sm-p} + i_{jm-p} \cdot i_{sm}}, \tag{C}$$

and wherein the operation judgment means judges discriminant $R_m \leq R_s$ from ohm value $R_m$ determined by the ohm value calculating means and setting value $R_s$.

7. A protective relay system as set forth in claim 3, wherein the controlled variable calculating means is constituted by operation/suppression quantity calculating means for calculating a quantity corresponding to an ohm value by the following equation (D) on the basis of the current data $i_{jm}$ and $i_{jm-p}$ which are outputs of the difference filter and the voltage data $v_{sm}$ and $v_{sm-p}$ and the current data $i_{sm}$ and $i_{sm-p}$ which are outputs of the additive filter:

$$c_m = -i_{jm} \cdot v_{sm-p} + v_{sm} \cdot i_{jm-p} \quad b_m = -i_{jm} \cdot i_{sm-p} + i_{jm-p} \cdot i_{sm} \tag{D}$$

and wherein the operation judging means judges discriminant $b_m \cdot R_s - c_m \leq K1$ from the operation/suppression quantity $c_m$ and $b_m$ determined by the operation/suppression quantity calculating means, and setting value $R_s$ and constant K1.

8. A protective relay system as set forth in claim 3, wherein the controlled variable calculating means is constituted by reactance value calculating means for determining reactance value $X_m$ by the following equation (A) on the basis of the current data $i_{jm}$ and $i_{jm-p}$ which are outputs of the difference filter, and the voltage data $v_{sm}$ and $v_{sm-p}$ and the current data $i_{sm}$ and $i_{sm-p}$ which are outputs of the addition filter:

$$X_m = \frac{-v_{sm} \cdot i_{sm-p} + i_{sm} \cdot v_{sm-p}}{-i_{jm} \cdot i_{sm-p} + i_{jm-p} \cdot i_{sm}}, \tag{A}$$

and ohm value calculation means for determining ohm value $R_m$ by the following equation (C) on the basis of the current data $i_{jm}$ and $i_{jm-p}$ which are outputs of the difference filter and the voltage data $v_{sm}$ and $v_{sm-p}$ and the current data $i_{sm}$ and $i_{sm-p}$ which are outputs of the addition filter:

$$R_m = \frac{-i_{jm} \cdot v_{sm-p} + v_{sm} \cdot i_{jm-p}}{-i_{jm} \cdot i_{sm-p} + i_{jm-p} \cdot i_{sm}}, \tag{C}$$

and wherein the operation judging means serves to discriminate the discriminant (E) on the basis of the reactance value $X_m$ determined by the reactance value calculating means and the ohm value $R_m$ determined by the ohm value calculating means:

$$(R_m - R_O) \cdot (R_m - R_F) + (X_m - X_O) \cdot (X_m - X_F) \leq 0 \tag{E}$$

where $R_O$ (ohmic component) is setting value at the side close to the offset mho, $X_O$ (reactance component) is setting value at the side close to the offset mho, $R_F$ (ohmic component) is setting value at the side remote from the offset mho, and $X_F$ (reactance component) is setting value at the side remote from the offset mho.

9. A protective relay system as set forth in claim 3, wherein the controlled variable calculation means is constituted by polarity voltage preparation means for preparing polarity voltage vpjm having a predetermined relationship with respect to the voltage data $v_{jm}$ and/or $v_{sm}$ on the basis of the voltage data $v_{jm}$ which is output of the difference filter and voltage data $v_{sm}$ which is output of the addition filter, and the operation judgment for judging, on the basis of voltage data $v_{jm}$ and current data $i_{jm}$ which are outputs of the difference filter, voltage data $v_{sm}$ and current data $i_{sm}$ which are outputs of the additive filter, polarity voltage $V_{pjm}$ which is output of the polarity voltage preparation means, and setting values $R_s$ and $X_s$:

$$v_{pjm-p} \cdot \{(R_s \cdot i_{sm} + X_s \cdot i_{jm}) - v_{sm}\} \tag{F}$$
$$v_{pjm} \cdot \{(R_s \cdot i_{sm-p} + X_s \cdot i_{jm-p}) - v_{sm-p}\} \geq K2.$$

10. A protective relay system as set forth in claim 9, wherein the polarity voltage preparation means synthesizes a voltage orthogonal in a fundamental wave with respect to output $v_{sm}$ of the addition filter in terms of vector to output the synthesized voltage as the polarity voltage $v_{pjm}$ to the operation judgment means.

11. A protective relay system as set forth in claim 9,
wherein the polarity voltage preparation means serves to output a voltage earlier by predetermined time of voltage data $v_{jm}$ from the difference filter at the sampling time point $t_m$ to the operation judgement means.

12. A protective relay system as set forth in claim 9,
wherein the polarity voltage preparation means serves to synthesize positive phase voltage from output $v_{jm}$ of the difference filter and output $v_{sm}$ of the additive filter with three-phase voltage of the power system at the sampling time $t_m$ being as reference to output the synthesized voltage as the polarity voltage $v_{pjm}$ to the operation determination means.

13. A protective relay system as set forth in claim 3,
wherein the controlled variable calculation means is composed of:
charge current compensation means for determining predetermined electric variable $(i_{sm}-C_s \cdot v_{jm})$ on the basis of the voltage data $v_{jm}$ as output of the differential filter at the sampling time point $t_m$, the current data $i_{sm}$ as output of the additive filter, and setting value $C_s$; and transmitting/receiving means adapted for transmitting the predetermined electric variable $(i_{sm}-C_s \cdot v_{jm})$ delivered from the charge current compensation means to a destination electric station except for the electric station where the protective relay system is installed and for receiving electric variable $(i_{sm}-C_s \cdot v_{jm})$ B from any other protective relay system installed in the destination electric station, and wherein the operation judgment means serves to judges, on the basis of the predetermined electric variable $(i_{sm}-C_s \cdot v_{jm})$ delivered from the charge current compensation means and the predetermined electric variable $(i_{sm}-C_s \cdot v_{jm})$ B delivered from the transmitting/receiving means whether or not the following discriminant (G) holds:

$$\|(i_{sm}-C_s \cdot v_{jm})+(i_{sm}-C_s \cdot v_{jm})B\| \geq ka\{\|i_{sm}-C_s \cdot v_{jm}\|+\|(i_{sm}-C_s \cdot v_{jm})B\|\}+kb \tag{G}$$

where $\|a\|$ is quantity proportional to amplitude value of a.c. electric variable a at the time point of $t_m$, ka is No. ratio suppression digits (absolute number), and kb is minimum sensitivity current.

* * * * *